(12) United States Patent
Smith, III

(10) Patent No.: US 7,762,525 B2
(45) Date of Patent: Jul. 27, 2010

(54) PRESSURE-BALANCED UNDERSEA HYDRAULIC COUPLING

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 758 days.

(21) Appl. No.: 11/686,679

(22) Filed: Mar. 15, 2007

(65) Prior Publication Data
US 2008/0224466 A1 Sep. 18, 2008

(51) Int. Cl.
*F16L 29/00* (2006.01)
*F16L 17/02* (2006.01)

(52) U.S. Cl. ............... 251/149.7; 137/614.04; 285/106; 285/900

(58) Field of Classification Search ........... 137/614, 137/614.04, 614.03, 614.05; 251/149.1, 251/149.6, 149.7; 285/108, 111, 917, 106, 285/900
See application file for complete search history.

(56) References Cited

U.S. PATENT DOCUMENTS

| | | | | |
|---|---|---|---|---|
| 4,832,080 A | * | 5/1989 | Smith, III | 137/614.04 |
| 5,099,882 A | | 3/1992 | Smith, III | |
| 5,203,374 A | | 4/1993 | Smith, III | |
| 5,360,035 A | | 11/1994 | Smith | |
| 6,123,103 A | | 9/2000 | Smith, III | |
| 6,202,690 B1 | | 3/2001 | Smith, III | |
| 7,063,328 B2 | * | 6/2006 | Smith, III | 137/614.04 |
| 7,578,312 B2 | * | 8/2009 | Smith, III | 137/614.04 |
| 2005/0029749 A1 | | 2/2005 | Smith, III | |

* cited by examiner

*Primary Examiner*—Kevin L Lee
(74) *Attorney, Agent, or Firm*—Wong, Cabello, Lutsch, Rutherford & Brucculeri, L.L.P.

(57) ABSTRACT

A pressure-balanced hydraulic coupling suitable for undersea use comprises a male member having one or more flow ports on the side of its probe section and a poppet valve actuator extending from the end of the probe section which has a fluid-tight seal around the actuator. The female member has a removable annular flow piece for fluid communication with the flow ports in the probe of the male member. In certain embodiments the annular flow piece has integral probe seals. In other embodiments, the removable annular flow piece comprises a seal retainer. In yet other embodiments, the removable annular flow piece comprises the inner part of a two-part seal cartridge.

43 Claims, 23 Drawing Sheets

PRESSURE-BALANCED UNDERSEA HYDRAULIC COUPLING

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

This invention relates to hydraulic couplings. More particularly, it relates to pressure-balanced undersea hydraulic couplings.

2. Description of the Related Art

A wide variety of hydraulic coupling members adapted for use in the subsea environment are known and used. In a basic coupling, the probe of the male member may act as a piston in an hydraulic cylinder—the cylinder being the receiving chamber of the female member. Hydraulic fluid under pressure exerts a force on the male probe proportional to its cross-sectional area. This force tends to push the probe of the male member out of the receiving chamber of the female member. Since a hydraulic system may be pressurized when coupling members are joined, this piston action can significantly increase the force necessary to make up the connection. This is especially problematic in undersea applications because couplings must often be made up using remotely operated vehicles (ROV's). A plurality of hydraulic couplings are often made up together on a manifold plate. Thus, the mating force required can be significant, necessitating larger and more powerful ROVs to accomplish.

In response to this problem, a number of pressure-balanced hydraulic couplings have been developed. The design of a pressure-balanced coupling is such that the system hydraulic pressure does not act differentially on the cross section of the male probe. The following patents of National Coupling Company (Stafford, Tex.) describe pressure-balanced couplings:

U.S. Pat. Nos. 5,099,882 and 5,203,374 entitled "Pressure balanced hydraulic coupling with metal seals" (which are related to one another) disclose a pressure-balanced hydraulic coupling for use in undersea drilling and production operations. The coupling has radial passageways communicating between the male and female members such that substantial fluid pressure is not exerted against the face of either member during coupling or uncoupling or during the coupled state. Check valves in both the male and female members are opened when the male member probe is fully inserted into the receiving chamber of the female member. Mutually opposed valve actuators contact one another to effectuate the simultaneous opening of each check valve, and allow fluid to flow through a valve port and then radially through matching fluid passageways in the male and female members. The radial passageways of the male and female members match up at their longitudinal surfaces so that fluid pressure between the male and female members is in a substantially radial direction and is not exerted at the face of either member. A first pair of seals is positioned on each side of the radial passage for sealing between the receiving chamber and the seal retainer. A second pair of seals is positioned on each side of the radial passage for sealing between the seal retainer and the male member. The seals are pressure-energized metal seals.

U.S. Pat. No. 6,202,690 entitled "Pressure balanced undersea hydraulic coupling" discloses an undersea hydraulic coupling is pressure balanced to reduce forces tending to urge the coupling members apart during coupling or uncoupling. A seal retainer having an L-shaped fluid passage is used to provide fluid communication between the radial fluid passage in the male member and the longitudinal fluid passage in the female member of the coupling. The seal retainer holds one or more radial seals in the female member upon disengagement of the male coupling member.

U.S. Pat. No. 6,123,103 entitled "Pressure balanced coupling with split body" discloses a pressure balanced hydraulic coupling for use in undersea drilling and production operations that has radial passages connecting between the male and female members such that fluid pressure is not exerted against the face of either member during coupling or uncoupling. The female member has a split body with a first part and a second part, each having a longitudinal passage and a radial fluid passage. A radial seal is positioned on the junction between the first and second parts of the female member body to facilitate removal and replacement of the radial seal when the split body is disassembled. The male member may be inserted through the first and second parts of the female coupling member, thereby establishing fluid communication between the coupling members in a direction transverse to the coupling member bores.

U.S. Pat. No. 5,360,035 entitled "Pressure balanced poppet valve for hydraulic couplings" discloses an undersea hydraulic coupling having a poppet valve movable between an open and a closed position that operates without substantial fluid pressure exerted axially against the face of the poppet valve. When the poppet valve is opened, radial passages are interconnected through an annular cavity between the poppet valve body and the valve bore.

U.S. Patent Application Publication No. US 2005/0029749 discloses an undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned. In certain embodiments, the bore liner is fabricated from PEEK.

Pressure balanced couplings are generally more complex and more difficult to manufacture than non-pressured balanced couplings. A simplified pressure-balanced coupling would be advantageous. As space for coupling members on manifold plates and tubing hangars becomes ever more restricted, a need exists for a smaller, less complex pressure balanced coupling. A pressure balanced coupling with a bore liner also represents a needed improvement.

BRIEF SUMMARY OF THE INVENTION

A simplified, pressure-balanced, undersea hydraulic coupling comprises a male member having a hollow, cylindrical, probe section with one or more flow ports on its side. The flow ports may be of the anti-fouling type. A poppet valve actuator may extend from the end of the probe section. A replaceable actuator seal surrounds the actuator to prevent the loss of hydraulic fluid.

The female member of the pressure-balanced coupling has a removable annular flow piece sized and configured for fluid communication with the flow ports in the probe of the male member. A longitudinal passage in the flow piece provides fluid communication between an annular flow passage in the flow piece and a ring-shaped passage in the body of the female member. The ring-shaped passage provides fluid communication with the flow piece without the need for indexing the flow piece in the female body.

In certain embodiments the annular flow piece comprises integral probe seals. In other embodiments, the removable annular flow piece comprises a seal retainer for replaceable dovetail probe seals. In yet other embodiments, the removable annular flow piece comprises the inner part of a two-part seal cartridge. Various probe seal configurations may be utilized including double crown seals.

BRIEF DESCRIPTION OF THE SEVERAL VIEWS OF THE DRAWING(S)

DETAILED DESCRIPTION OF THE INVENTION

The present invention may best be understood by reference to various embodiments.

Figure 1:
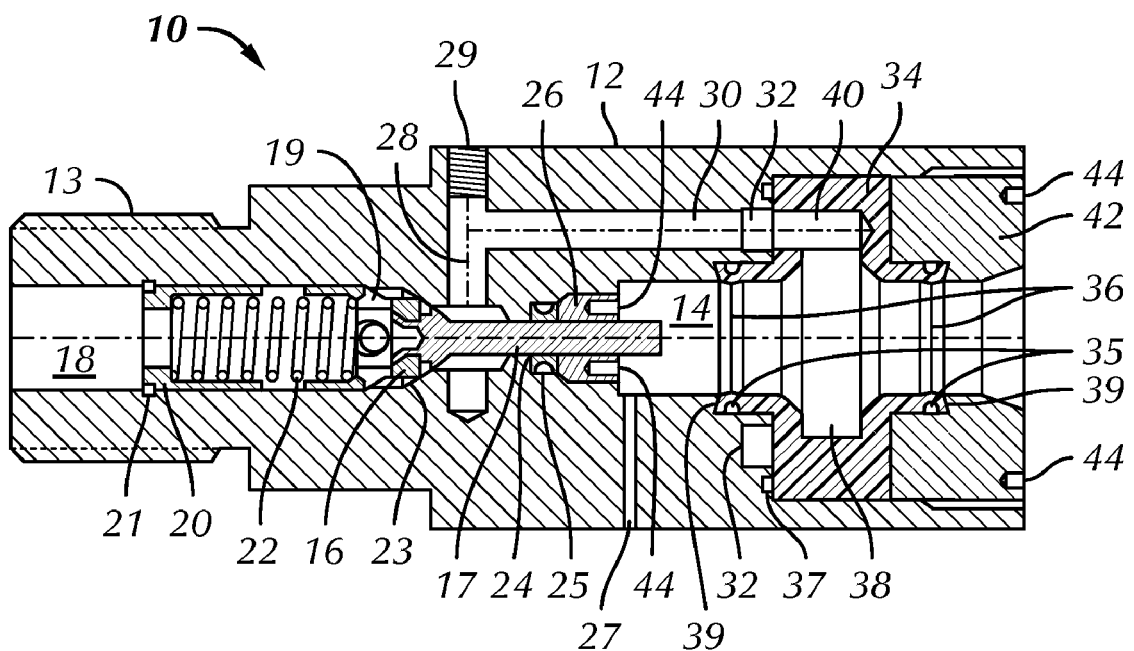
FIG. 1 is a cross-sectional view of a female hydraulic coupling member according to one embodiment of the invention.

FIG. 1 shows a female coupling member according to a first embodiment of the invention. Female coupling member 10 comprises generally cylindrical body 12 having central axial bore 18 extending from a first end to a second end, threaded connector 13 at the first end thereof for conventional connection to a hydraulic conduit or the like, and receiving chamber 14 at the second end for receiving the probe of a corresponding male hydraulic coupling member.

Figure 4A:
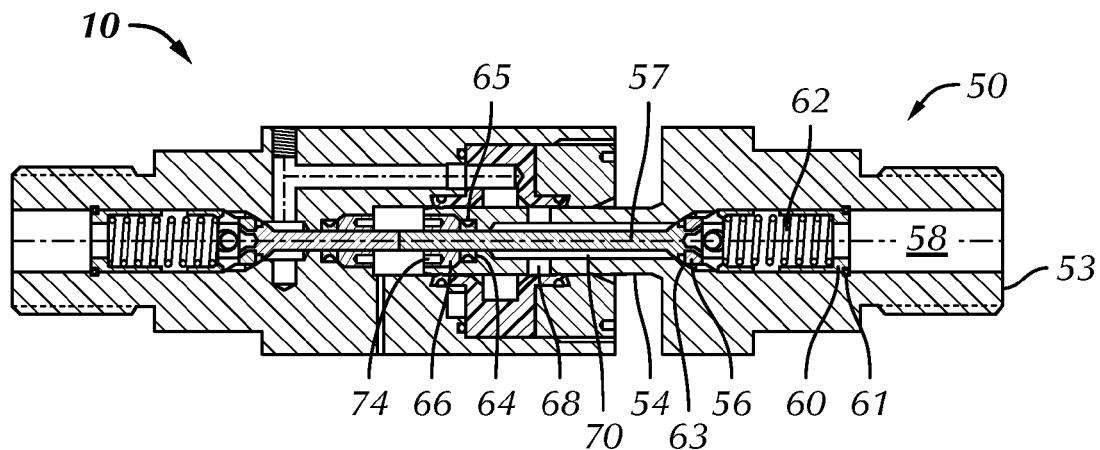
FIG. 4A is a cross-sectional view of the female coupling depicted in FIG. 1 in partial engagement with a male coupling member of the type shown in FIG. 2.
Figure 4B:
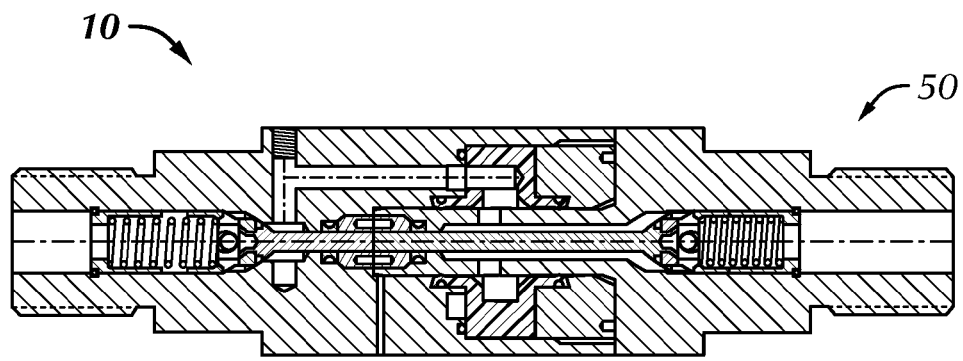
FIG. 4B is a cross-sectional view of the female coupling depicted in FIG. 1 fully engaged with a male coupling member of the type shown in FIG. 2.

Poppet valve 16 having flow ports 19 seals against frusto-conical surface 23 in axial bore 18 under the influence of spring 22 which bears against spring seat 20 retained in axial bore 18 by retainer 21 which may be in a circumferential groove in the wall of bore 18. Poppet actuator 17 extends from poppet valve 16 into receiving chamber 14. As illustrated in FIGS. 4A and 4B, when the coupling is fully made up, the poppet actuator of the male member contacts actuator 17, opening poppet valve 16. Seal 24 (which may include O-ring 25) retained by threaded retainer nut 26 provides a fluid-tight seal between actuator 17 and female body 12. Seal 24 provides sealing engagement for the sliding motion of actuator 17 as it moves poppet valve 16 between its open and closed positions. Retainer nut 26 may comprise cavities 44 for engaging a spanner or other tool.

Female body 12 also comprises radial flow passage 28 which provides fluid communication between axial bore 18 and axial flow passage 30. Plug 29 may seal the external end of passage 29. Flow passage 30 is in fluid communication with circular flow passage 32.

Probe seal 34 may be held within receiving chamber 14 by threaded retainer nut 42 which may be equipped with spanner engagement holes 44. Angled shoulders 39 on seal 34 engage corresponding angled surfaces on retainer nut 42 and receiving chamber 14 to provide resistance to implosion of seal 34 into receiving chamber 14 under the influence of reduced pressure. Seal 34 may include radial sealing elements 36, as shown. O-ring seals 35 may provide a fluid-tight radial seal between probe seal 34 and body 12. Seal 37, which may be an O-ring seal in certain embodiments, may provide an annular seal between seal 34 and body 12. Seal 37 may be housed in a generally circular groove in a shoulder within bore 18.

Probe seal 34 comprises annular flow passage 38 which is in fluid communication with circular flow passage 32 via axial flow passage 40. Circular flow passage 32 ensures that axial flow passage 40 in seal 34 is in fluid communication with axial flow passage 30 in body 12 even if flow passages 30 and 40 are not coaxial when seal 34 is installed in body 12.

Sea vent 27 provides fluid communication between the interior end of receiving chamber 14 and the surrounding environment. In undersea applications, receiving chamber 14 will typically be filled with seawater prior to coupling make up. When the probe of the male member is inserted in the receiving chamber 14 the water in receiving chamber 14 must have an exit in order to prevent hydraulic lock. Likewise, when the probe of the male member is withdrawn from the receiving chamber 14, sea vent 27 allows vacuum relief by providing a path for seawater to enter chamber 14.

Body 12, retainer nuts 42 and 26, spring seat 20, retainer 21, spring 22 poppet valve 16 and valve actuator 17 may be fabricated from any suitable material. Various high-strength, corrosion-resistant, stainless steel alloys are particularly preferred. Seals 24, 25, 35 and 37 may be fabricated of elastomeric polymer material (elastomers). Probe seal 34 with annular flow path may, in certain embodiments, be fabricated using engineering plastics. Probe seal 34 may be molded, machined or both molded and machined. One particularly preferred material for probe seal 34 is polyetheretherketone (PEEK). Additional examples of suitable materials include DELRIN™ acetal resin engineering plastic (also called polyoxymethylene (POM), polytrioxane and polyformaldehyde), TEFLON™ polytetrafluoroethylene (PTFE), glass-filled PTFE, PEEK-filled PTFE, and other relatively soft, machinable polymers.

Figure 2:
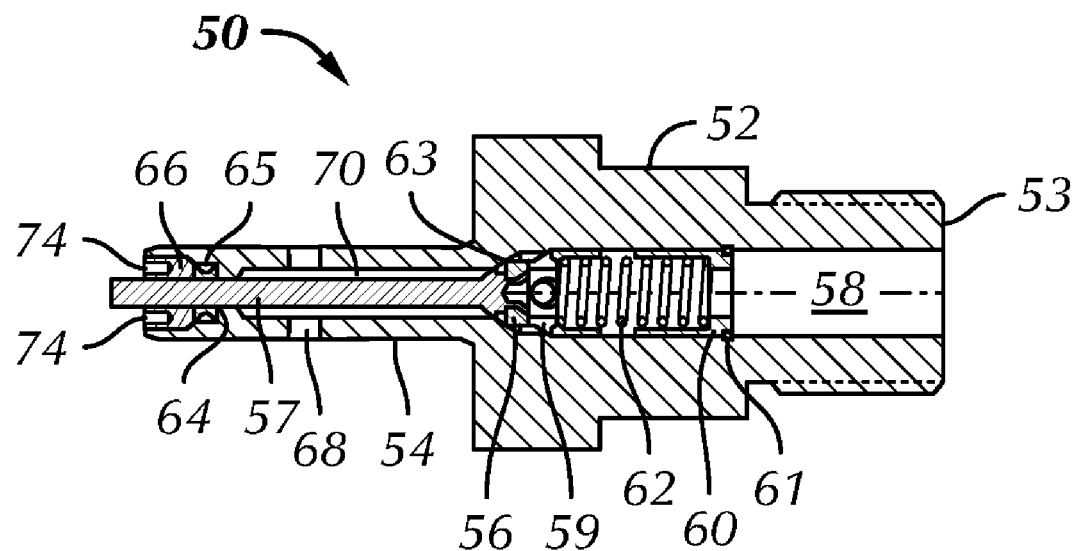
FIG. 2 is a cross-sectional view of a male hydraulic coupling member of a first type which is configured for use with any of the female coupling members depicted in the drawing figures.

A male coupling member according to one embodiment of the invention is shown in FIG. 2. Male coupling 50 comprises body 52, threaded connector 53 at one end of body 52 for convention connection to a hydraulic line or the like and probe 54 at the opposing end of body 52. Probe 54 may be sized and configured to fit within receiving chamber 14 of female member 10 in sealing engagement with probe seal 34.

Figure 5A:
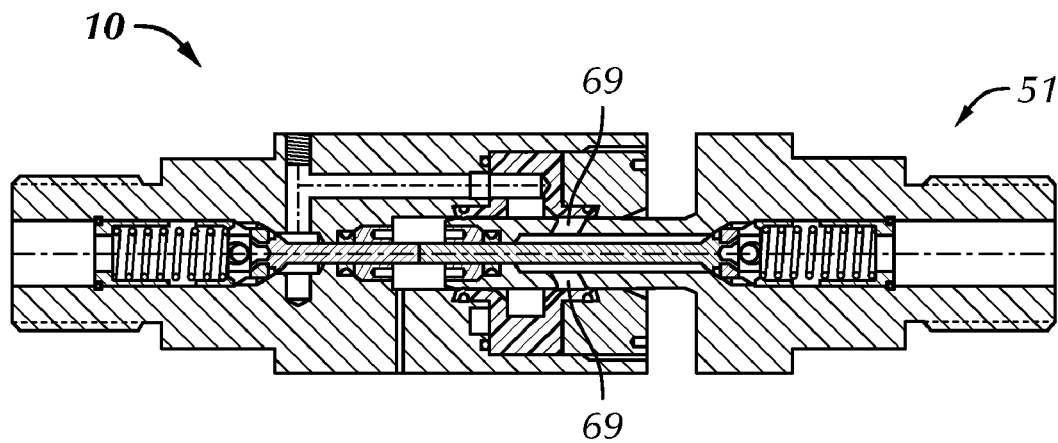
FIG. 5A is a cross-sectional view of the female coupling depicted in FIG. 1 in partial engagement with a male coupling member of the type shown in FIG. 3.
Figure 5B:
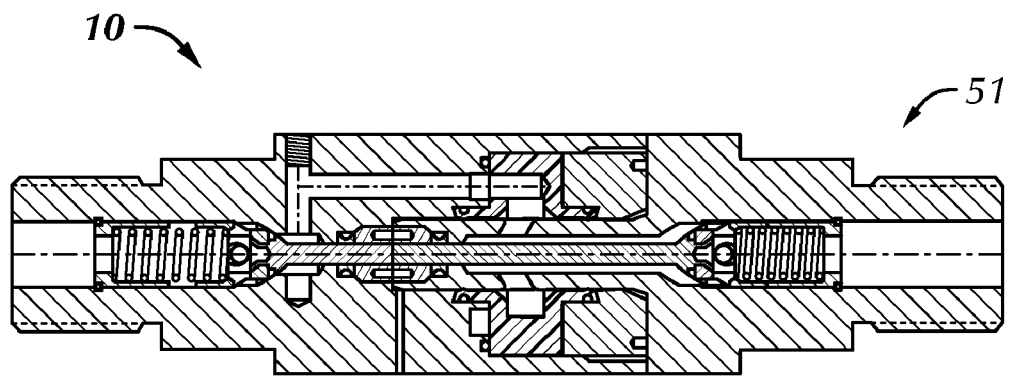
FIG. 5B is a cross-sectional view of the female coupling depicted in FIG. 1 fully engaged with a male coupling member of the type shown in FIG. 3.

Poppet valve 56 having flow ports 59 seals against frustoconical surface 63 in axial bore 58 under the influence of spring 62 which bears against spring seat 60 retained in axial bore 58 by retainer 61 which may engage a circumferential groove in the wall of bore 58. Poppet actuator 57 extends from poppet valve 56 through probe 54 and extends from the face of probe 54. As illustrated in FIGS. 4B and 5B, when the coupling is fully made up, the poppet actuator of the female member contacts actuator 57, opening poppet valve 56. Seal 64 (which may include O-ring 65) retained by threaded retainer nut 66 provides a fluid-tight seal between actuator 57 and male probe 54. Seal 64 provides sealing engagement for the sliding motion of actuator 57 as it moves poppet valve 56 between its open and closed positions. Retainer nut 66 may comprise cavities 74 for engaging a spanner or other tool to facilitate installation and/or removal.

Radial flow ports 68 provide fluid communication from the external surface of probe 54 to annular axial flow passage 70.

Figure 3:
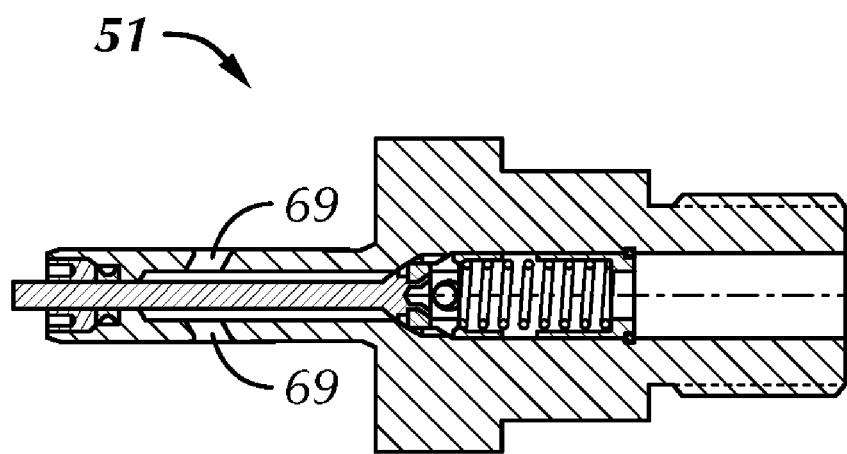
FIG. 3 is a cross-sectional view of a male hydraulic coupling member of a second type which is configured for use with any of the female coupling members depicted in the drawing figures.

A male coupling member 51 according to a second type is shown in FIG. 3. In this embodiment of the male coupling member, flow ports 69 which provide fluid communication from the external surface of probe 54 to annular axial flow passage 70 are at an acute angle to the longitudinal axis of coupling 50. In this embodiment anti-fouling ports 68 are provided in the sides of probe section 54 for the flow of hydraulic fluid into or out of the annulus 70 between the interior wall of probe 54 and valve actuator 57. Ports 69 are preferably angled as shown in FIG. 3. In use, male hydraulic coupling members are often vertically oriented in the subsea environment. When the male coupling is not mated to a corresponding female coupling member, the male probe is subject to fouling and contamination from debris settling towards the ocean floor. Angled ports 69 resist fouling by reason of being angled downward, away from the settling path of most debris. Debris is therefore less likely to enter the annulus 70 within the probe section 54 and foul the connector.

It will be appreciated that the various female coupling members illustrated in this disclosure may be used with either a male coupling member according to the embodiment shown in FIG. 2 having radial flow ports 68 or a male coupling member according to the embodiment shown in FIG. 3 having angled, anti-fouling flow ports 69.

FIG. 4A shows a female coupling member according to the embodiment depicted in FIG. 1 in partial engagement with a male coupling member of the type shown in FIG. 2. FIG. 4B shows the female coupling fully engaged with the male coupling member. FIG. 5A shows a female coupling member according to the embodiment illustrated in FIG. 1 in partial engagement with a male coupling member of the type shown in FIG. 3. FIG. 5B shows the female coupling member fully engaged with the male coupling member.

In use, coupling make up is accomplished by the insertion of male probe 54 of male coupling member 50 into receiving chamber 14 of female coupling member 10. An intermediate stage in this process is illustrated in FIG. 4A wherein the male and female coupling members are partially engaged. As insertion of the male probe 54 continues and both sealing elements 36 of seal unit 34 engage the outer cylindrical surface of probe 54, seawater which would otherwise be trapped in the inner portion of receiving chamber 14 (and prevent further insertion of probe 54 due to its incompressibility) is expelled through sea vent 27.

In FIGS. 4A and 5A the hydraulic coupling members are shown engaged to the extent of poppet actuator (17 and 57) contact, but not to the extent required to unseat (i.e., open) poppet valves 16 and 56. In FIGS. 4B and 5B the male and female coupling members are shown fully engaged and it may be seen that the poppet valves are now held open by the mutual depression of poppet actuators 17 and 57. It may also be seen that seal unit 34 has formed two, circumferential seals around male probe 54, one on either side of flow ports 68 at crown seals 36.

Hydraulic fluid, under pressure in central bore 58 of male member 50, may flow through flow ports 59 of open poppet valve 56 and into annular passage 70 and out radial flow ports 68. At this point the hydraulic fluid enters annular flow passage 38 of seal unit 34 and may flow via axial connecting passage 40 into circular flow passage 32 in body 12 of female member 10. Thence, the fluid may flow via passage 30 to connecting radial passage 28 and into central bore 18. Poppet valve 16 being open, the fluid may flow through flow ports 19 and out connector 13. It will be appreciated that the flow of hydraulic fluid may equally well be in the opposite direction from that described above.

In FIGS. 5A and 5B a male coupling member 50 of the type illustrated in FIG. 3 having anti-fouling flow ports 69 is shown in partial and full engagement, respectively, with the same type of female coupling member 50 as that illustrated in FIGS. 1, 4A and 4B.

Figure 6:
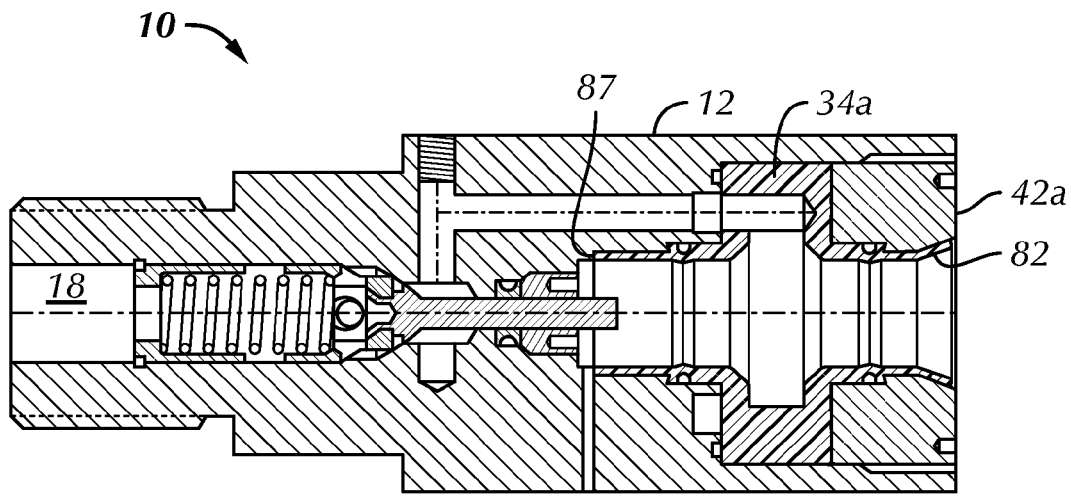
FIG. 6 is a cross-sectional view of a female coupling member according to an embodiment of the invention which has an integral seal and annular flow piece with a full bore liner.

FIG. 6 depicts a female coupling member according to an embodiment of the invention which has an annular flow piece 34a with an integral seal and a full bore liner comprised of outer segment 82 and inner segment 84. In most other respects, the coupling member of FIG. 6 is similar to the coupling member of FIG. 1. Retainer nut 42a may be specially adapted, as shown, to accommodate outer bore liner segment 82. Central axial bore 18 of female body 12 may be modified, as shown, to include shoulder 87 to accommodate inner bore liner segment 84. Bore liner segments 82 and 84 prevent metal-to-metal contact between the probe of the male coupling member and the inner walls of receiving chamber 14 of female coupling member 10. In this way, galling and scratching of the mating portions of the coupling members is mitigated.

Figure 6A:
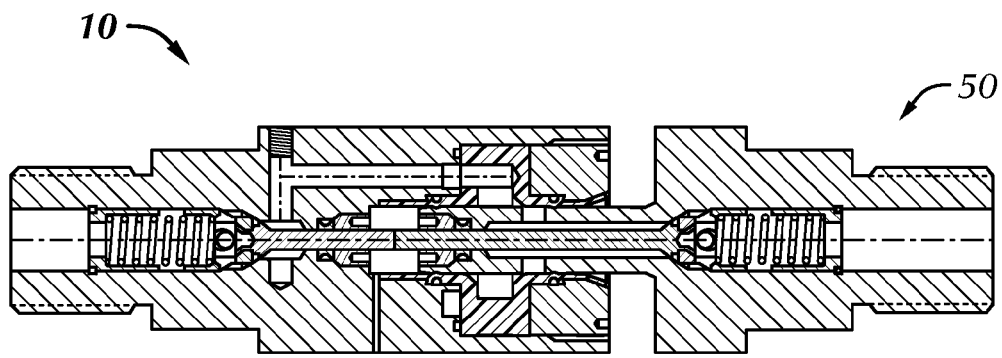
FIG. 6A is a cross-sectional view of the female coupling depicted in FIG. 6 in partial engagement with a male coupling member of the type shown in FIG. 2.
Figure 6B:
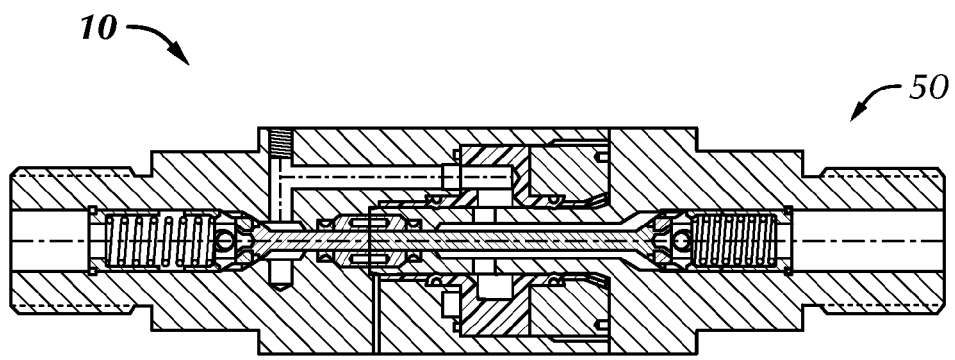
FIG. 6B is a cross-sectional view of the female coupling depicted in FIG. 6 fully engaged with a male coupling member of the type shown in FIG. 2.

The female coupling of FIG. 6 is depicted in FIG. 6A in partial engagement with a male coupling member of the type shown in FIG. 2 and in full engagement with the male member in FIG. 6B. A male coupling having anti-fouling flow ports of the type illustrated in FIG. 3 may also be used.

Figure 7:
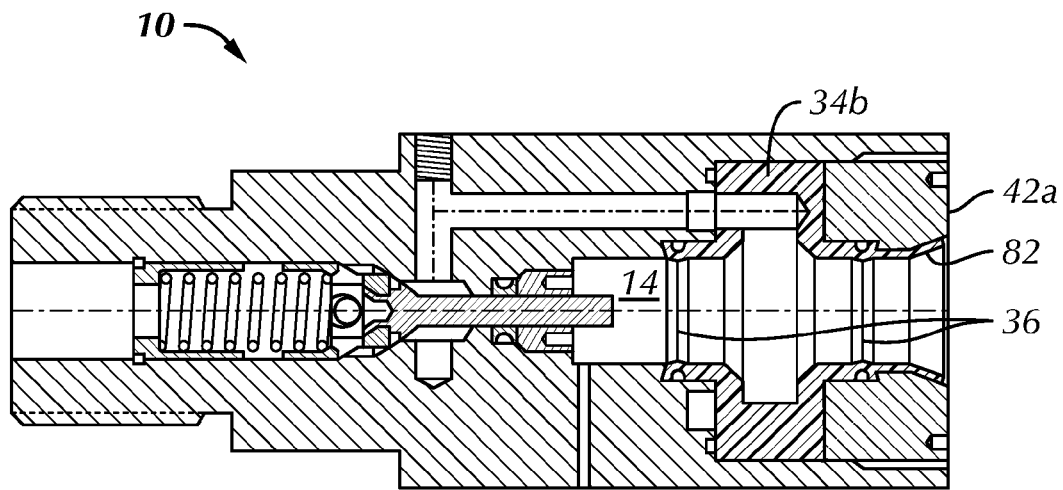
FIG. 7 is a cross-sectional view of a female coupling member according to an embodiment of the invention which has an integral seal and annular flow piece which includes a partial bore liner.

FIG. 7 shows a female coupling member according to an embodiment of the invention which has an annular flow piece with an integral seal and which includes a partial bore liner comprised of outer segment 82. In most other respects, the coupling member of FIG. 7 is similar to the coupling member of FIG. 1. Retainer nut 42a may be specially adapted, as shown, to accommodate outer bore liner segment 82. Bore liner 82 prevents metal-to-metal contact between the probe of the male coupling member and the walls of receiving chamber 14 of female coupling member 10 comprised of the central opening in retainer nut 42a. In this way, galling and scratching of the mating portions of the coupling members is mitigated. Unlike the coupling member depicted in FIG. 6, the innermost portion of receiving chamber 14 is not protected with a bore liner. In certain applications, the alignment of the male probe provided by its engagement with both inner and outer seals 36 may be sufficient to reduce the likelihood of contact with the inner portion of the receiving chamber 14 to an acceptable level.

Figure 7A:
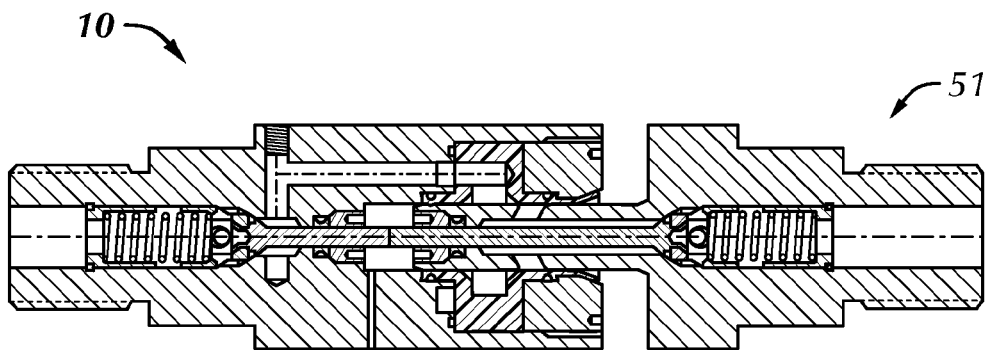
FIG. 7A is a cross-sectional view of the female coupling depicted in FIG. 7 in partial engagement with a male coupling member of the type shown in FIG. 3.
Figure 7B:
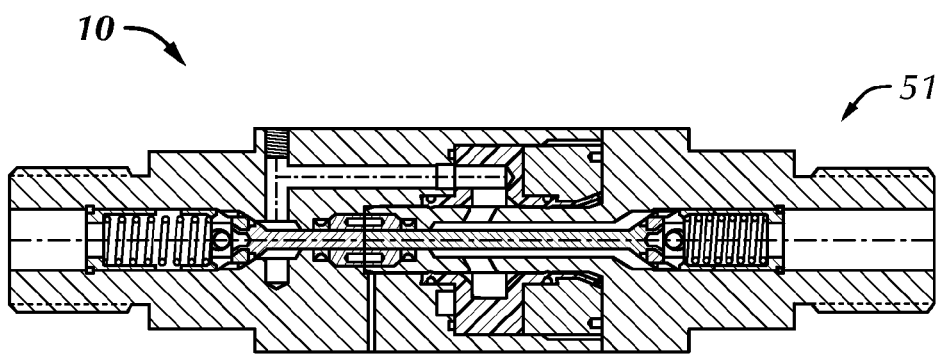
FIG. 7B is a cross-sectional view of the female coupling depicted in FIG. 7 fully engaged with a male coupling member of the type shown in FIG. 3.

The female coupling of FIG. 7 is shown in FIG. 7A in partial engagement with a male coupling member of the type shown in FIG. 3 and in full engagement with the male member in FIG. 7B. A male member of the type shown in FIG. 2 may also be used with this coupling.

Figure 8:
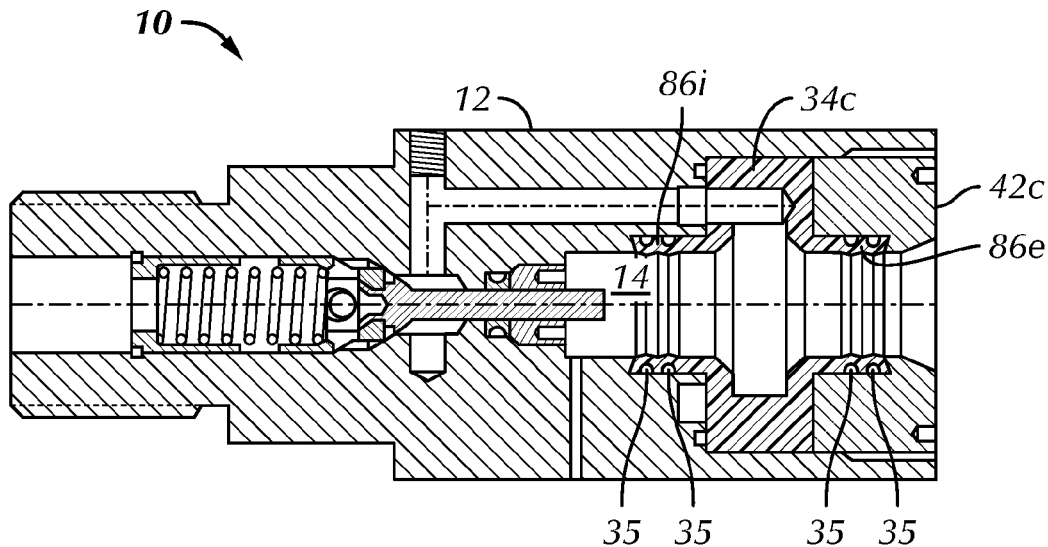
FIG. 8 is a cross-sectional view of a female coupling member according to an embodiment of the invention which has an integral seal and annular flow piece with double sealing members.

FIG. 8 illustrates a female coupling member according to an embodiment of the invention which has an annular flow piece 34c with an integral seal having a pair of double crown seals 86 for enhanced sealing effectiveness. Each sealing element may have an associated O-ring seal 35 to seal to female body 12 or retainer nut 42c. In most other respects, the coupling member of FIG. 8 is similar to the coupling member of FIG. 1. Retainer nut 42c and axial bore 14 may be specially adapted, as shown, to accommodate the additional length of seal and flow piece 34.

Figure 8A:
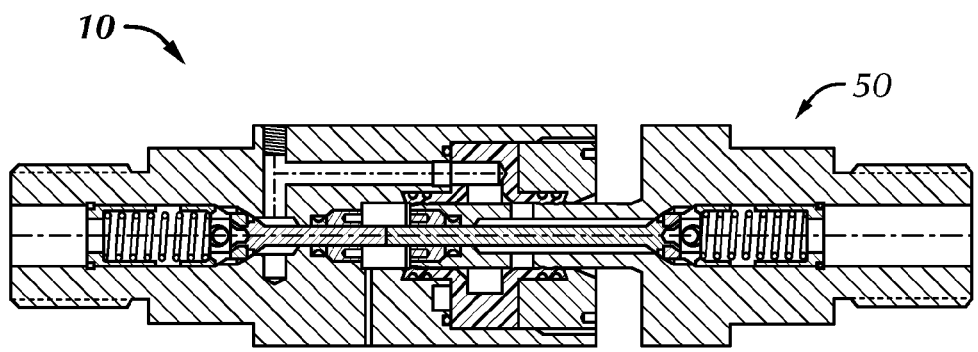
FIG. 8A is a cross-sectional view of the female coupling depicted in FIG. 8 in partial engagement with a male coupling member of the type shown in FIG. 2.
Figure 8B:
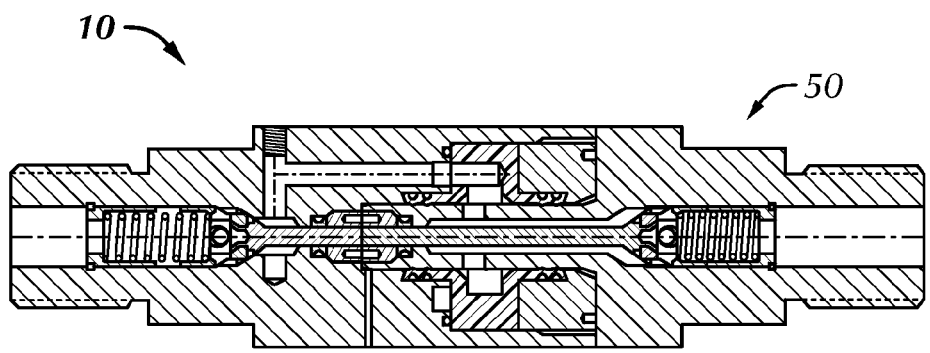
FIG. 8B is a cross-sectional view of the female coupling depicted in FIG. 8 fully engaged with a male coupling member of the type shown in FIG. 2.

The female coupling of FIG. 8 is depicted in FIG. 8A in partial engagement with a male coupling member of the type shown in FIG. 2 and in full engagement with the male member in FIG. 8B. A male coupling having anti-fouling flow ports of the type illustrated in FIG. 3 may also be used.

Figure 9:
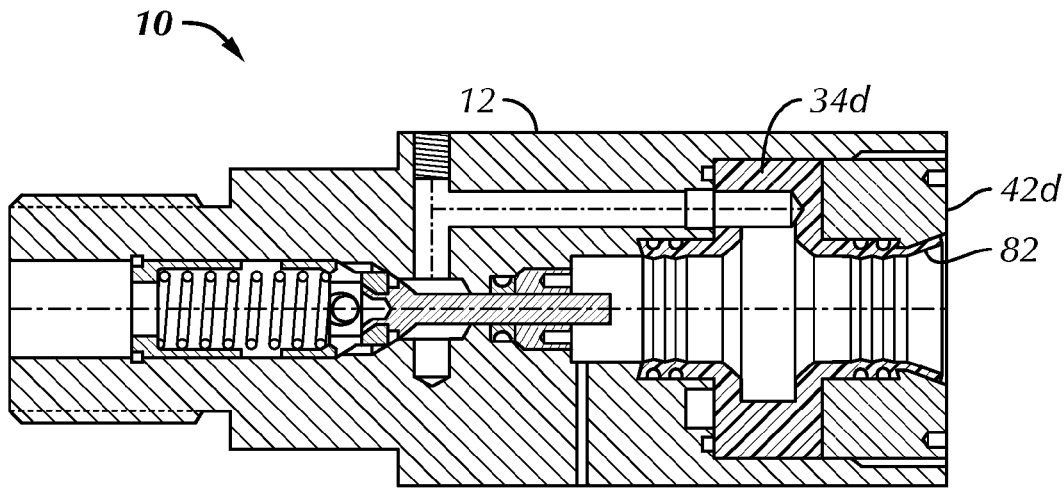
FIG. 9 is a cross-sectional view of a female coupling member according to an embodiment of the invention which has an integral seal and annular flow piece with double sealing members and a partial bore liner.

FIG. 9 shows a female coupling member according to an embodiment of the invention which has an annular flow piece 34d with an integral seal having double sealing members 86 and a partial bore liner 82 covering the outermost portions of receiving chamber 14. Retainer nut 42d may be configured as shown to accommodate bore liner 82. In other respects, the coupling is similar to that illustrated in FIG. 8.

Figure 9A:
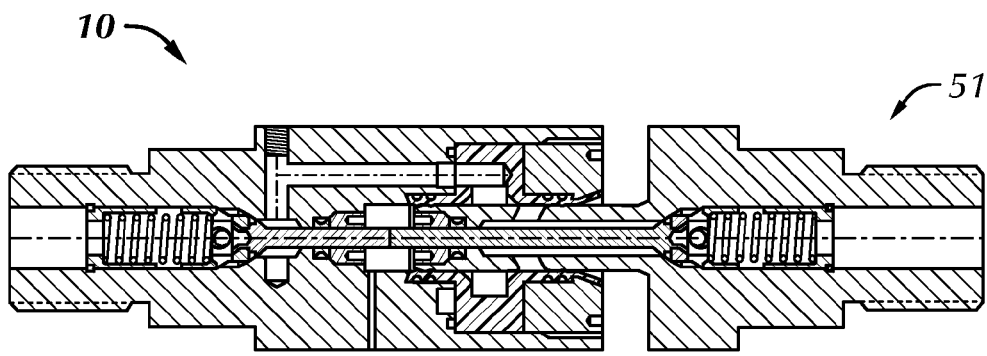
FIG. 9A is a cross-sectional view of the female coupling depicted in FIG. 9 in partial engagement with a male coupling member of the type shown in FIG. 3.
Figure 9B:
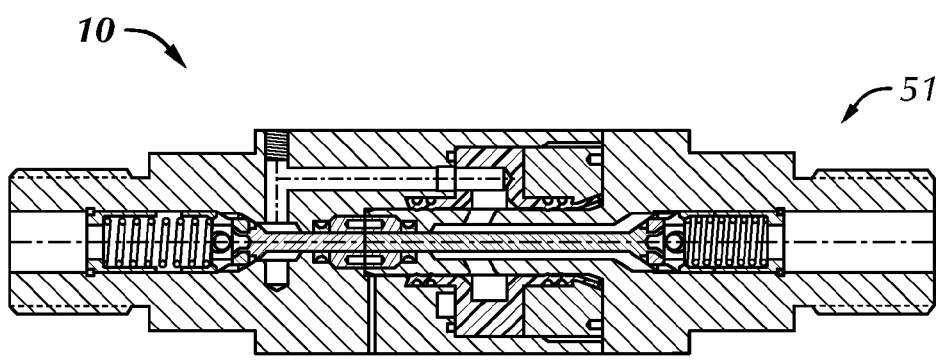
FIG. 9B is a cross-sectional view of the female coupling depicted in FIG. 9 fully engaged with a male coupling member of the type shown in FIG. 3.

The female coupling of FIG. 9 is shown in FIG. 9A in partial engagement with a male coupling member of the type shown in FIG. 3 and in full engagement with the male member in FIG. 9B. A male member of the type shown in FIG. 2 may also be used with this coupling.

Figure 10:
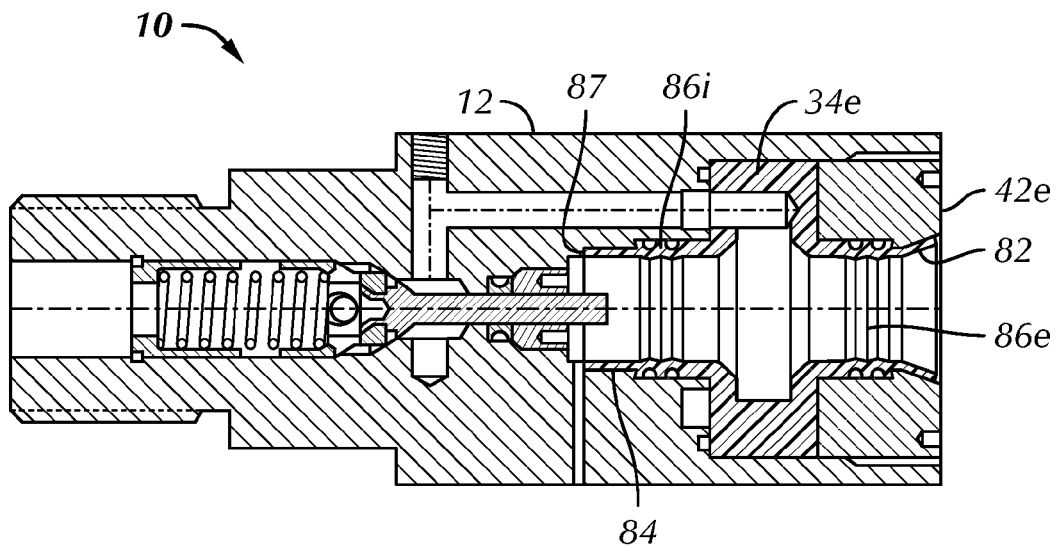
FIG. 10 is a cross-sectional view of a female coupling member according to an embodiment of the invention which has an integral seal and annular flow piece with double sealing members and a full bore liner.

FIG. 10 is a cross-sectional view of a female coupling member according to an embodiment of the invention which has an annular flow piece 34e with integral seal having double sealing members 86 and a full bore liner comprised of outer segment 82 and inner segment 84. Retainer nut 42e may be adapted, as shown, for outer bore liner segment 82 and bore 14 may have shoulder 87 to accommodate inner bore liner segment 84. In other respects, the coupling corresponds to that depicted in FIG. 8.

Figure 10A:
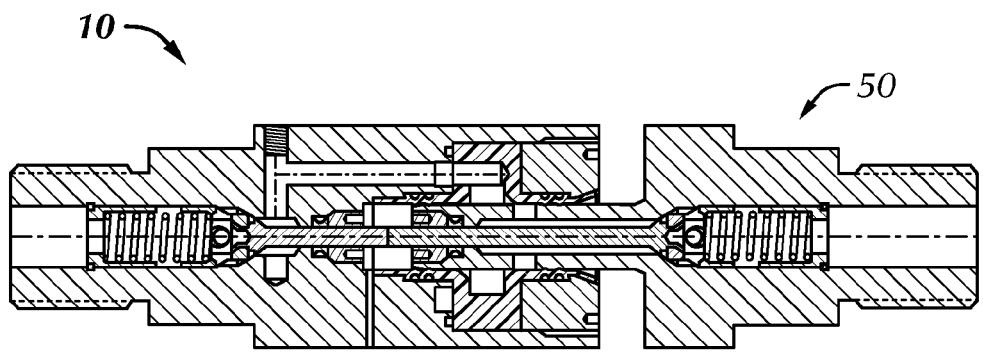
FIG. 10A is a cross-sectional view of the female coupling depicted in FIG. 10 in partial engagement with a male coupling member of the type shown in FIG. 2.
Figure 10B:
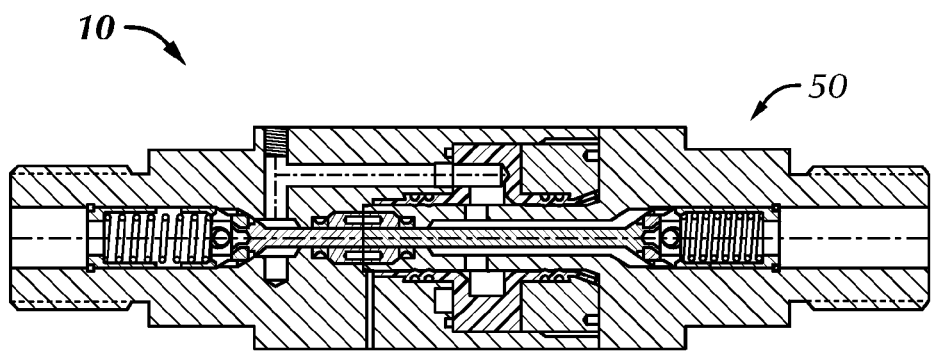
FIG. 10B is a cross-sectional view of the female coupling depicted in FIG. 10 fully engaged with a male coupling member of the type shown in FIG. 2.

The female coupling of FIG. 10 is depicted in FIG. 10A in partial engagement with a male coupling member of the type shown in FIG. 2 and in full engagement with the male member in FIG. 10B. A male coupling having anti-fouling flow ports of the type illustrated in FIG. 3 may also be used.

Figure 11:
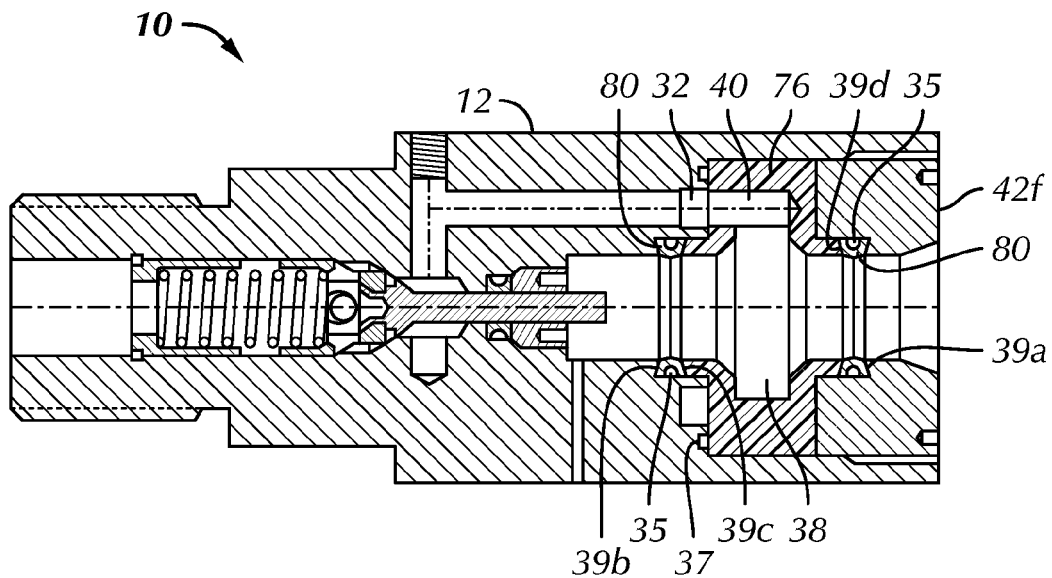
FIG. 11 is a cross-sectional view of a female coupling member according to an embodiment of the invention which has a seal retainer with an annular flow passage.

FIG. 11 illustrates a female coupling member according to an embodiment of the invention which has a seal retainer 76 with an annular flow passage 38. Seal retainer 76 has longitudinal flow passage 40 for fluid communication with circular passage 32 in body 12 of female member 10. Seal retainer 76 has angled shoulders 39c and 39d, as shown which cooperate with angled shoulders 39b and 39a of axial bore 14 and retainer nut 42f, respectively, to engage and hold fast dovetail seals 80. The dovetail configuration of seals 80 resists inward, radial movement of the seals, especially when the male probe is withdrawn from receiving chamber 14 and a negative pressure situation may be created. Seal 37, which may be an O-ring seal in certain embodiments, may provide an annular seal between seal retainer 76 and body 12. Seal 37 may be housed in a generally circular groove in a shoulder within bore 18. FIG. 11C depicts an alternative embodiment wherein sealing element 37 is contained in a generally circular groove on shoulder 41 of seal retainer 76.

Figure 11A:
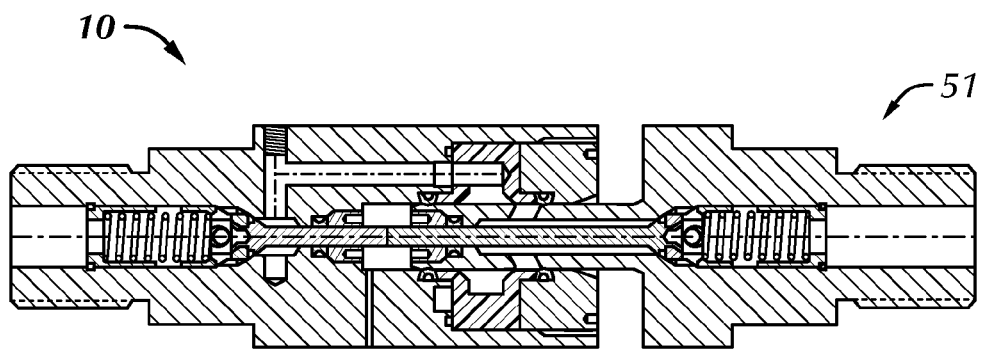
FIG. 11A is a cross-sectional view of the female coupling depicted in FIG. 11 in partial engagement with a male coupling member of the type shown in FIG. 3.
Figure 11B:
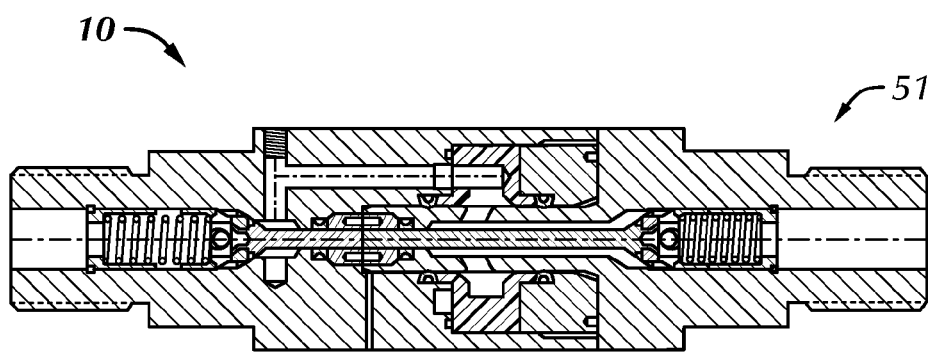
FIG. 11B is a cross-sectional view of the female coupling depicted in FIG. 11 fully engaged with a male coupling member of the type shown in FIG. 3.
Figure 11C:
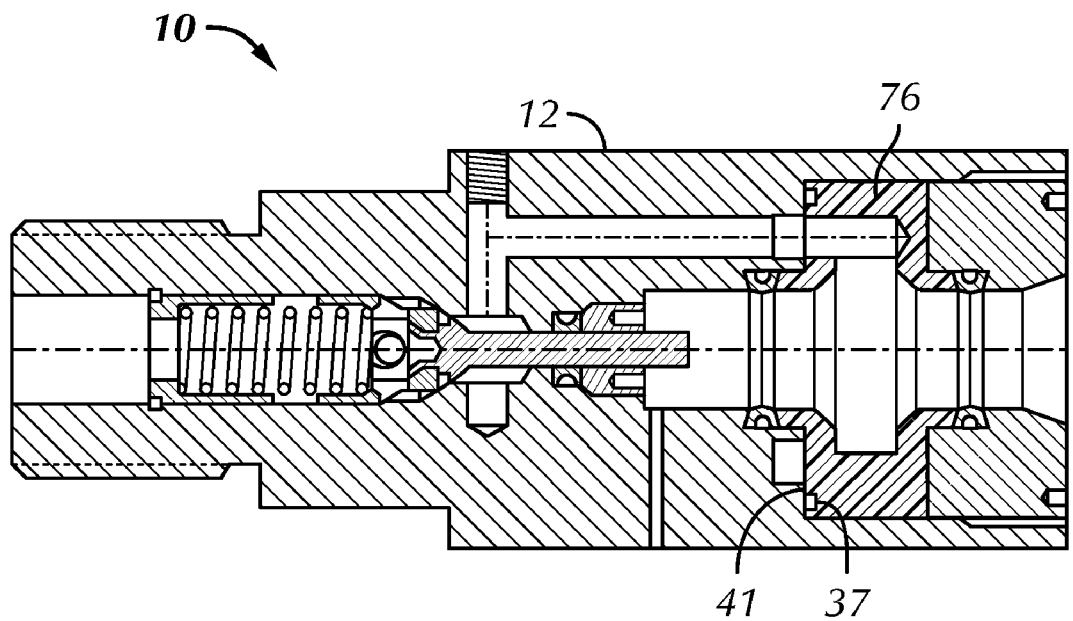
FIG. 11C is a cross-sectional view of an alternative embodiment of the female hydraulic coupling member shown in FIG. 11.

The female coupling of FIG. 11 is shown in FIG. 11A in partial engagement with a male coupling member of the type shown in FIG. 3 and in full engagement with the male member in FIG. 11B. A male member of the type shown in FIG. 2 may also be used with this coupling.

Figure 12:
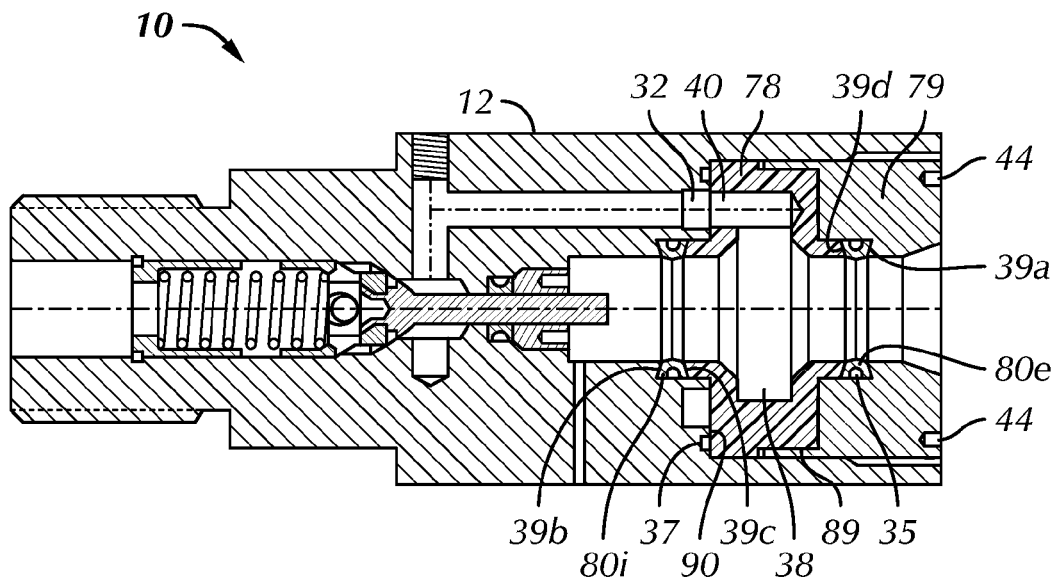
FIG. 12 is a cross-sectional view of a female coupling member according to an embodiment of the invention which has a seal cartridge with annular flow passage.

FIG. 12 is a cross-sectional view of a female coupling member according to an embodiment of the invention which has a seal cartridge comprised of outer member 79 and inner member 78 with annular flow passage 38. Outer shell portion 89 of member 79 engages a portion of the outer circumference of inner member 78 with an interference fit. Outer member 79 may be in threaded engagement with female body 12, as shown, and spanner engagement holes 44 may be provided in the exposed end of the seal cartridge to facilitate installation and removal. Seal 37 in a groove in shoulder 90 of axial bore 18 seals between inner seal cartridge member 78 and female body 12. Alternatively, seal 37 may be housed in a groove in the surface of inner member 78 which abuts shoulder 90 in the manner illustrated in FIG. 11C. Outer probe seal 80e is retained between angled shoulders 39d and 39a of inner member 78 and outer member 79, respectively. In this way, outer seal 86e may be inserted and removed as a unit with seal cartridge 78/79.

Longitudinal passage 40 in inner member 78 provides fluid communication between circular passage 32 in female body 12 and annular flow passage 38. Inner probe seal 80i has a dovetail cross section and may be retained between angled shoulder 39b of axial bore 18 and angled shoulder 39c of inner seal cartridge member 78. The dovetail configuration of seals 80 resists inward, radial movement of the seals, especially when the male probe is withdrawn from receiving chamber 14 and a negative pressure situation may be created.

Figure 12A:
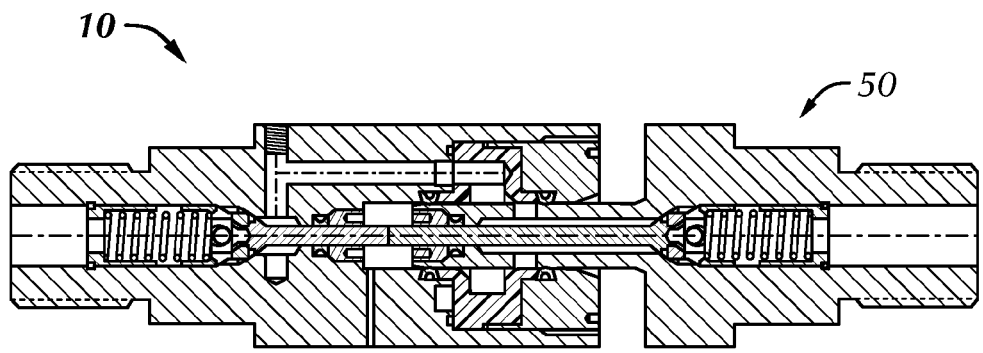
FIG. 12A is a cross-sectional view of the female coupling depicted in FIG. 12 in partial engagement with a male coupling member of the type shown in FIG. 2.
Figure 12B:
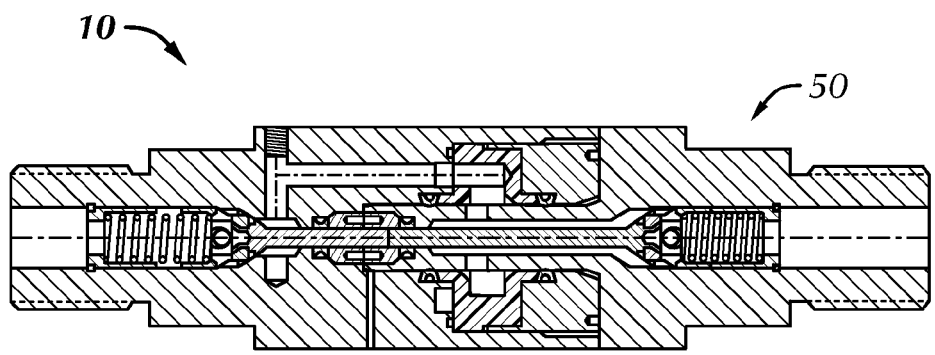
FIG. 12B is a cross-sectional view of the female coupling depicted in FIG. 12 fully engaged with a male coupling member of the type shown in FIG. 2.

The female coupling of FIG. 12 is depicted in FIG. 12A in partial engagement with a male coupling member of the type shown in FIG. 2 and in full engagement with the male member in FIG. 12B. A male coupling having anti-fouling flow ports of the type illustrated in FIG. 3 may also be used.

Figure 13:
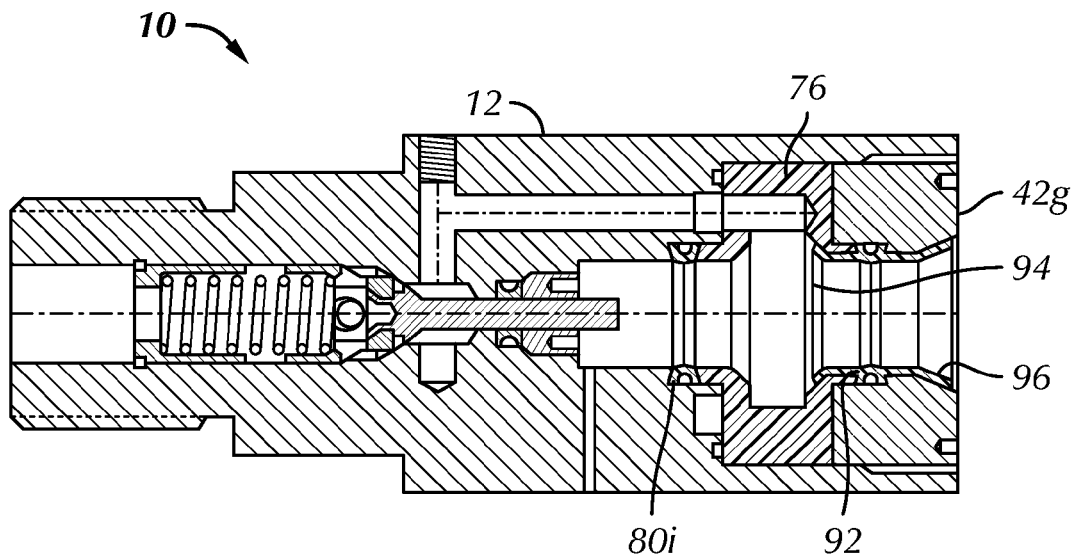
FIG. 13 is a cross-sectional view of a female coupling member according to an embodiment of the invention which has a seal retainer with an annular flow passage and a seal with an integral partial bore liner.

FIG. 13 is a cross-sectional view of a female coupling member according to an embodiment of the invention which has a seal retainer with an annular flow passage 38 and a retained, outer probe seal 92 having an integral, partial bore liner comprised of outer segment 96 and inner segment 94. Outer probe seal 92 may have a dovetail cross section in a portion of its outer circumference which may engage seal retainer 76a and retainer nut 42g in the manner described above in connection with the embodiment of FIG. 11. Inner dovetail probe seal 80i is likewise retained in the manner described above in connection with the embodiment of FIG. 11.

Figure 13A:
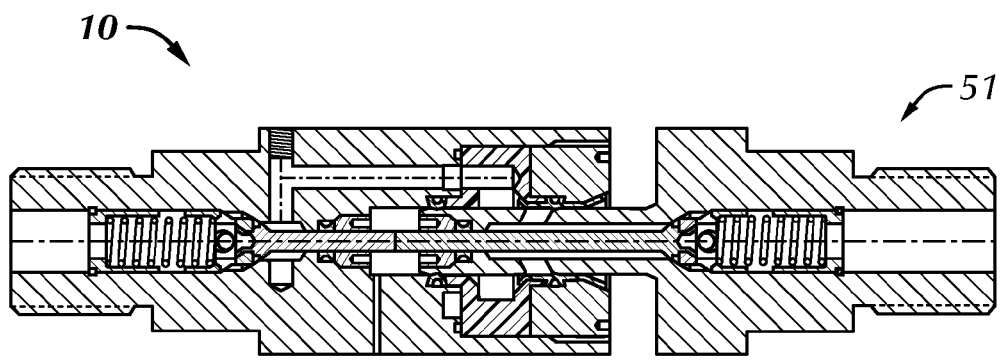
FIG. 13A is a cross-sectional view of the female coupling depicted in FIG. 13 in partial engagement with a male coupling member of the type shown in FIG. 3.
Figure 13B:
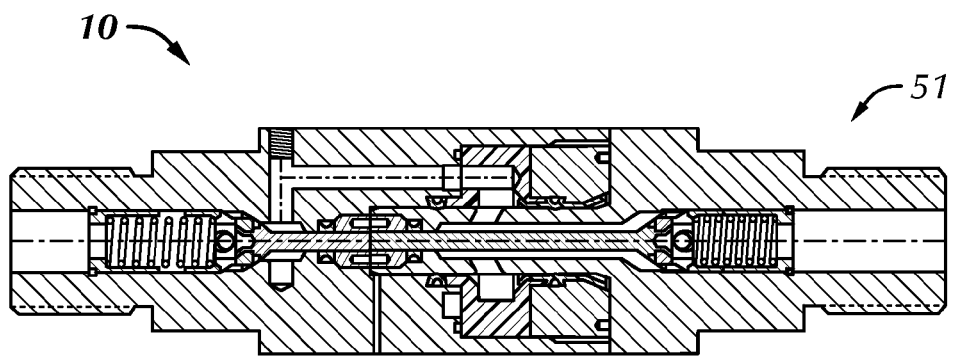
FIG. 13B is a cross-sectional view of the female coupling depicted in FIG. 13 fully engaged with a male coupling member of the type shown in FIG. 3.

The female coupling of FIG. 13 is shown in FIG. 13A in partial engagement with a male coupling member of the type shown in FIG. 3 and in full engagement with the male member in FIG. 13B. A male member of the type shown in FIG. 2 may also be used with this coupling.

Figure 14:
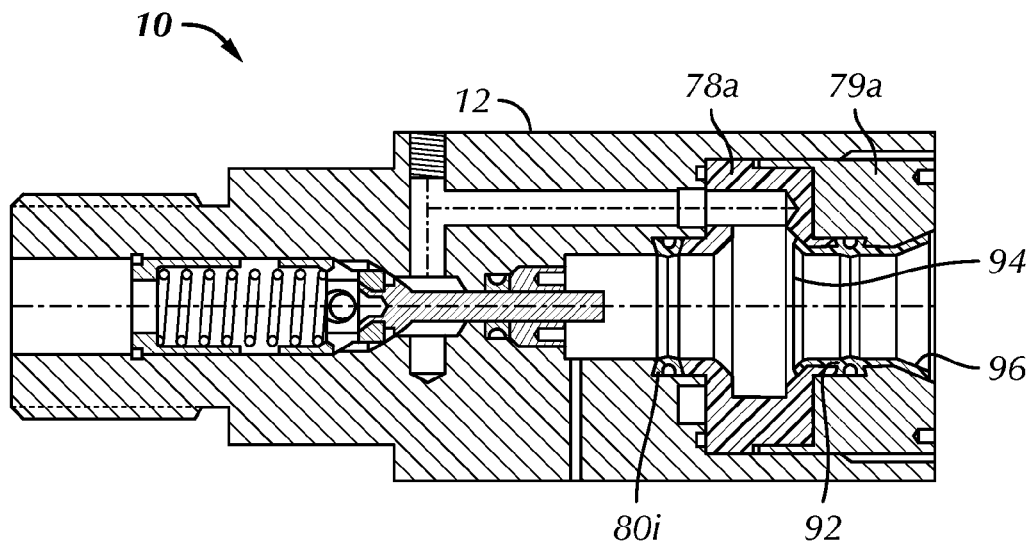
FIG. 14 is a cross-sectional view of a female coupling member according to an embodiment of the invention which has a seal cartridge with an annular flow passage and a seal with an integral partial bore liner.

FIG. 14 is a cross-sectional view of a female coupling member according to an embodiment of the invention which has a seal cartridge comprised of inner member 78a with an annular flow passage 38 and outer member 79a as described above in connection with the embodiment of FIG. 12. However, in the embodiment of FIG. 14, outer probe seal 92 includes an integral partial bore liner comprised of outer segment 96 and inner segment 94 as discussed above in connection with the embodiment of FIG. 13. Inner probe seal 80i may be a dovetail seal as described above in connection with the embodiment of FIG. 12.

Figure 14A:
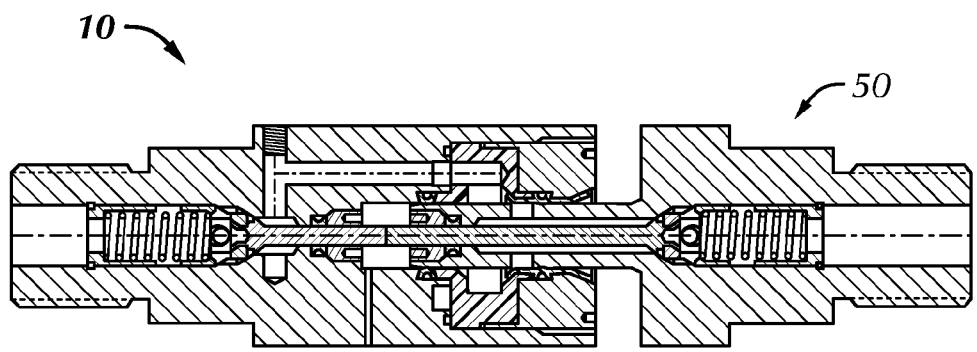
FIG. 14A is a cross-sectional view of the female coupling depicted in FIG. 14 in partial engagement with a male coupling member of the type shown in FIG. 2.
Figure 14B:
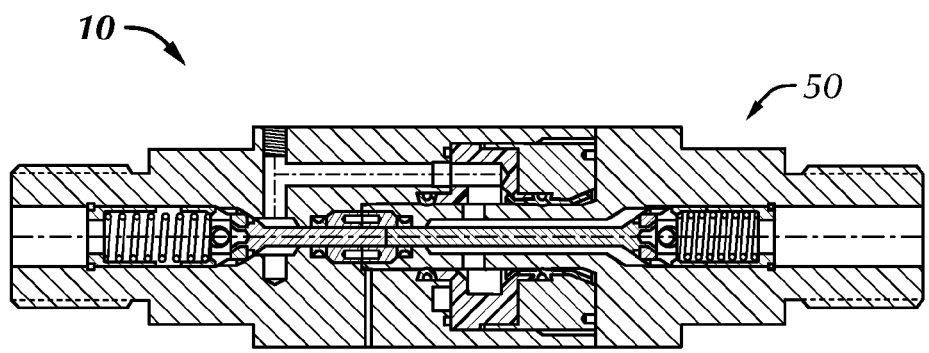
FIG. 14B is a cross-sectional view of the female coupling depicted in FIG. 14 fully engaged with a male coupling member of the type shown in FIG. 2.

The female coupling of FIG. 14 is depicted in FIG. 14A in partial engagement with a male coupling member of the type shown in FIG. 2 and in full engagement with the male member in FIG. 14B. A male coupling having anti-fouling flow ports of the type illustrated in FIG. 3 may also be used.

Figure 15:
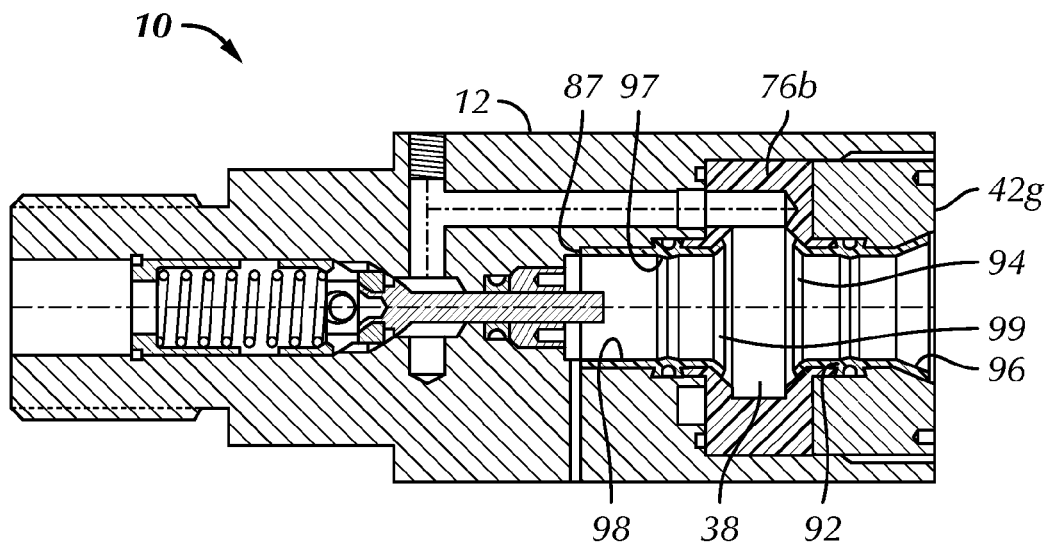
FIG. 15 is a cross-sectional view of a female coupling member according to an embodiment of the invention which has a seal retainer with an annular flow passage and two seals each having an integral bore liner.

FIG. 15 shows a female coupling member according to an embodiment of the invention which has a seal retainer 76b with an annular flow passage 38 and two retained seals 92 and 97 each of which has an integral bore liner. Inner probe seal 97 has an integral bore liner comprised of outer segment 99 and inner segment 98. At least a portion of the outer circumference of inner probe seal 97 may have a dovetail cross section and thereby engage corresponding angled shoulders in axial bore 18 and seal retainer 76b, as shown. Outer probe seal 92 may be configured as described above in connection with the embodiment of FIG. 13 and retainer nut 42g may be adapted, as shown, to accommodate bore liner segment 96.

Figure 15A:
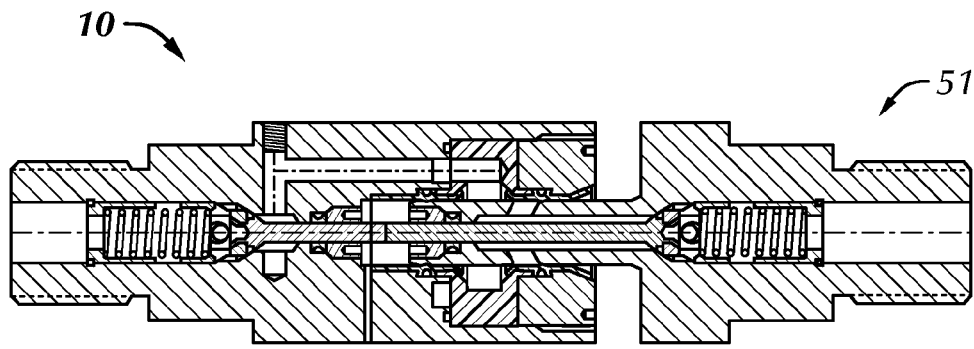
FIG. 15A is a cross-sectional view of the female coupling depicted in FIG. 15 in partial engagement with a male coupling member of the type shown in FIG. 3.
Figure 15B:
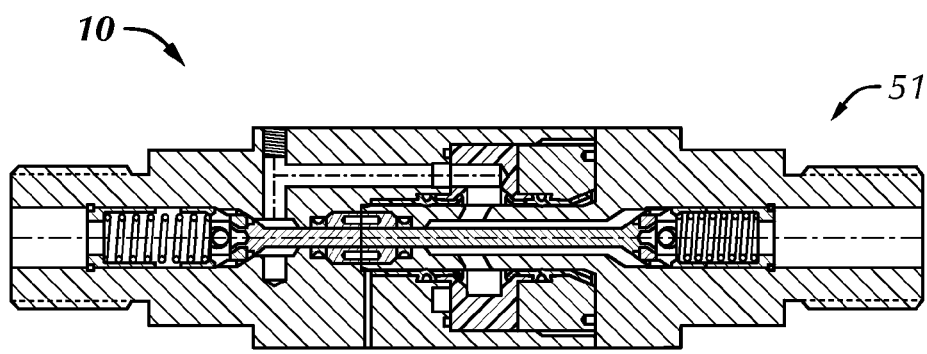
FIG. 15B is a cross-sectional view of the female coupling depicted in FIG. 15 fully engaged with a male coupling member of the type shown in FIG. 3.

The female coupling of FIG. 15 is shown in FIG. 15A in partial engagement with a male coupling member of the type shown in FIG. 3 and in full engagement with the male member in FIG. 15B. A male member of the type shown in FIG. 2 may also be used with this coupling.

Figure 16:
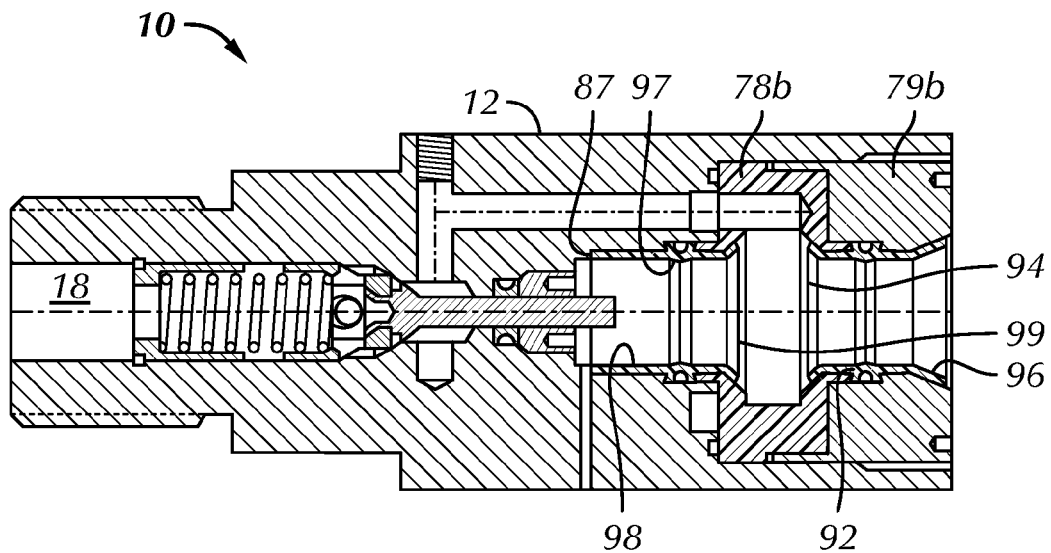
FIG. 16 is a cross-sectional view of a female coupling member according to an embodiment of the invention which has a seal cartridge with an annular flow passage and two seals, each with an integral bore liner.

FIG. 16 depicts a female coupling member according to an embodiment of the invention which has a seal cartridge comprised of inner part 78b with an annular flow passage and an outer part 79b similar to that described above in connection with the embodiment of FIG. 12. In the embodiment of FIG. 16, sear cartridge 78b/79b is adapted, as shown, for use with probe seals 92 and 97, each with an integral bore liner. Outer probe seal 92 has integral outer bore liner segment 96 and inner bore liner segment 94 of the type described above in connection with the embodiment of FIG. 14. Inner probe seal 97 comprises outer bore liner segment 99 and inner bore liner segment 98 as described above in connection with the embodiment of FIG. 14. Axial bore 18 may have shoulder to accommodate bore liner segment 98, as shown.

Figure 16A:
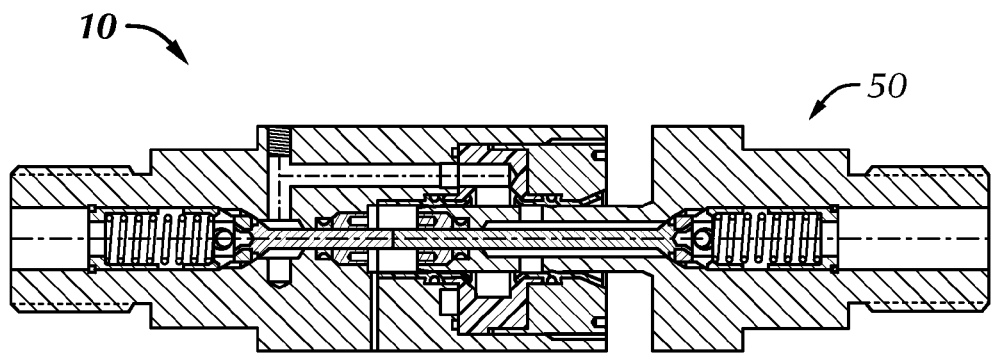
FIG. 16A is a cross-sectional view of the female coupling depicted in FIG. 16 in partial engagement with a male coupling member of the type shown in FIG. 2.
Figure 16B:
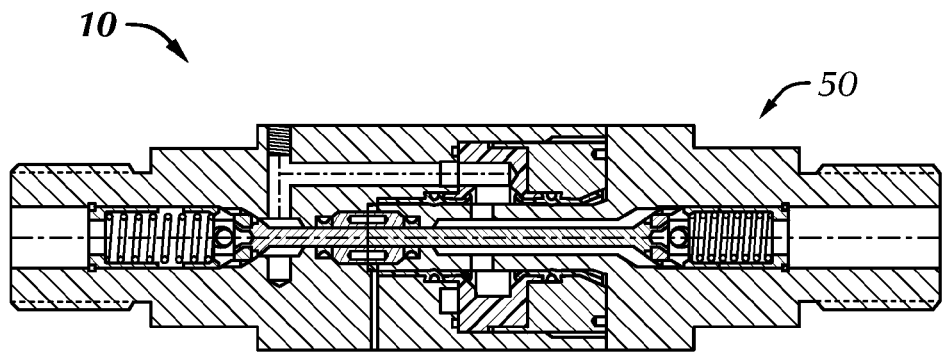
FIG. 16B is a cross-sectional view of the female coupling depicted in FIG. 16 fully engaged with a male coupling member of the type shown in FIG. 2.

The female coupling of FIG. 16 is depicted in FIG. 16A in partial engagement with a male coupling member of the type shown in FIG. 2 and in full engagement with the male member in FIG. 16B. A male coupling having anti-fouling flow ports of the type illustrated in FIG. 3 may also be used.

Figure 17:
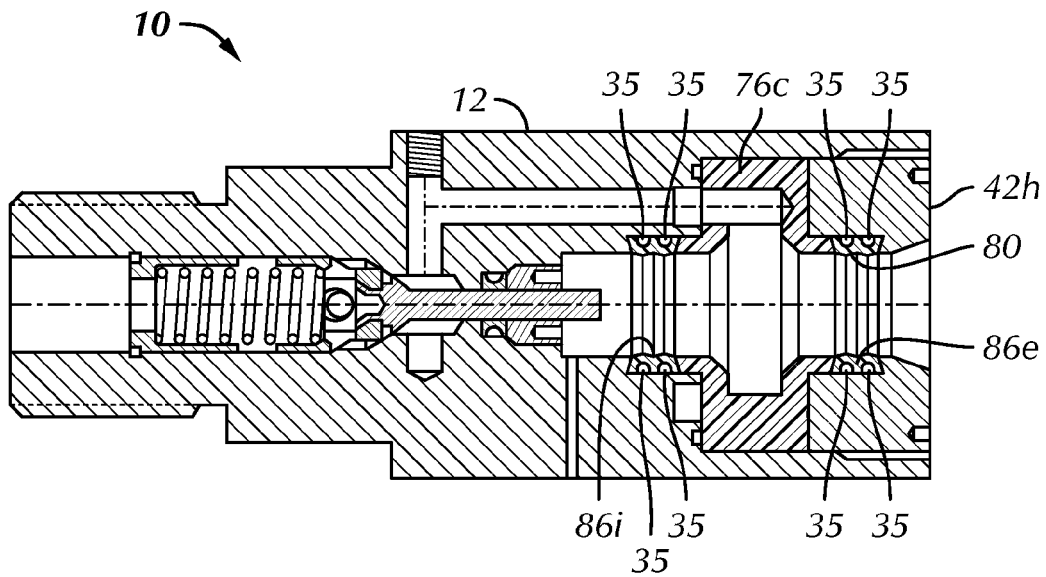
FIG. 17 is a cross-sectional view of a female coupling member according to an embodiment of the invention which has a seal retainer with an annular flow passage and a pair of retained seals having double sealing elements.

FIG. 17 represents a female coupling member according to an embodiment of the invention which has a seal retainer 76c with an annular flow passage 38 and a pair of retained seals 86 having double sealing elements. Seal retainer 76c and retainer nut 42h are similar to those described above in connection with the embodiment of FIG. 11, but adapted, as shown, to accommodate retained inner double crown seal 86i and outer double crown seal 86e. Each of double crown seals 86i and 86e may have a pair of circumferential O-ring seals 35 for sealing with body 12 and retainer nut 42h, respectively.

Figure 17A:
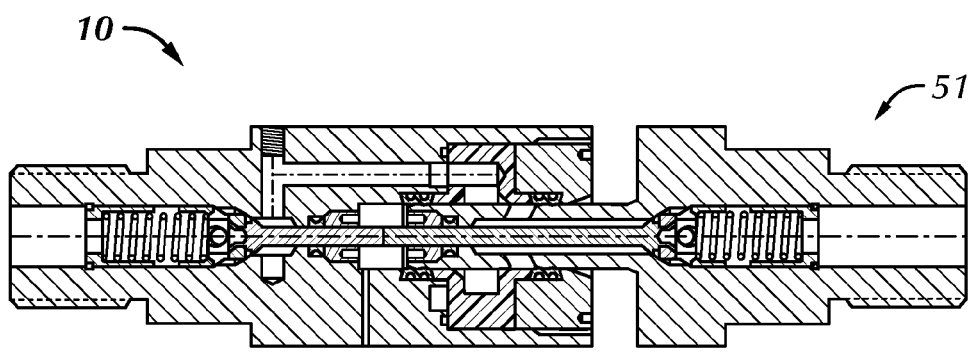
FIG. 17A is a cross-sectional view of the female coupling depicted in FIG. 17 in partial engagement with a male coupling member of the type shown in FIG. 3.
Figure 17B:
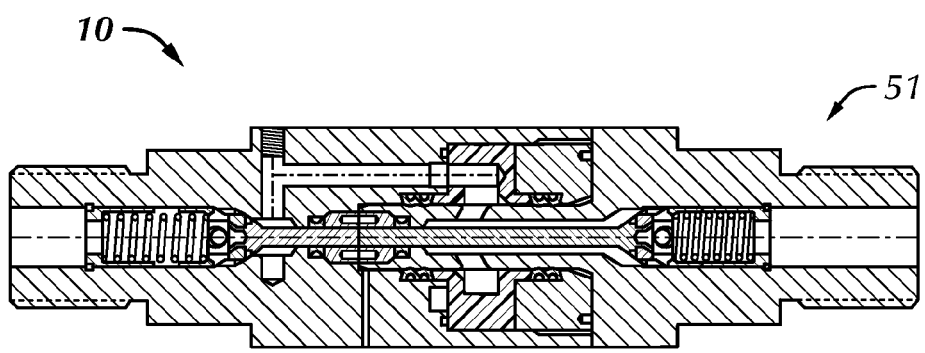
FIG. 17B is a cross-sectional view of the female coupling depicted in FIG. 17 fully engaged with a male coupling member of the type shown in FIG. 3.

The female coupling of FIG. 17 is shown in FIG. 17A in partial engagement with a male coupling member of the type shown in FIG. 3 and in full engagement with the male member in FIG. 17B. A male member of the type shown in FIG. 2 may also be used with this coupling.

Figure 18:
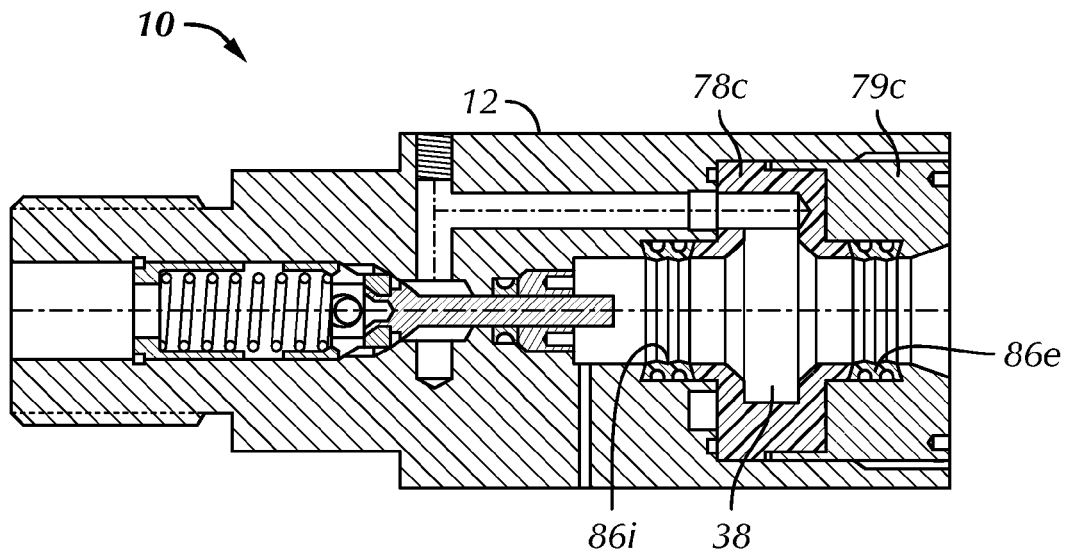
FIG. 18 is a cross-sectional view of a female coupling member according to an embodiment of the invention which has a seal cartridge with an annular flow passage and a pair of retained seals having double sealing elements.

FIG. 18 shows a female coupling member according to an embodiment of the invention which has a seal cartridge comprised of inner member 78c with an annular flow passage 38 and outer member 79c similar to that described above in connection with the embodiment of FIG. 12. The embodiment of FIG. 18 comprises pair of retained seals 86 having double sealing elements as described above in connection with the embodiment of FIG. 17.

Figure 18A:
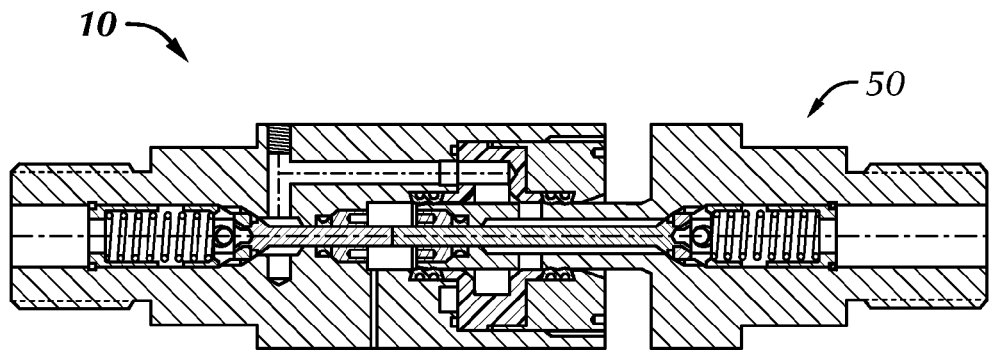
FIG. 18A is a cross-sectional view of the female coupling depicted in FIG. 18 in partial engagement with a male coupling member of the type shown in FIG. 2.
Figure 18B:
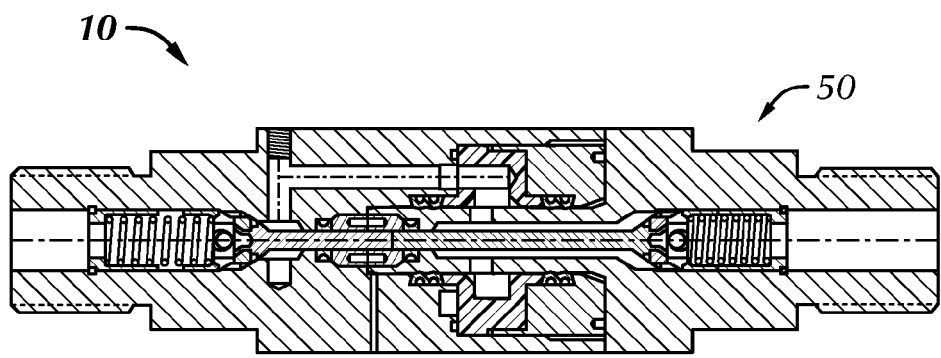
FIG. 18B is a cross-sectional view of the female coupling depicted in FIG. 18 fully engaged with a male coupling member of the type shown in FIG. 2.

The female coupling of FIG. 18 is depicted in FIG. 18A in partial engagement with a male coupling member of the type shown in FIG. 2 and in full engagement with the same male member in FIG. 18B. A male coupling having anti-fouling flow ports of the type illustrated in FIG. 3 may also be used.

Figure 19:
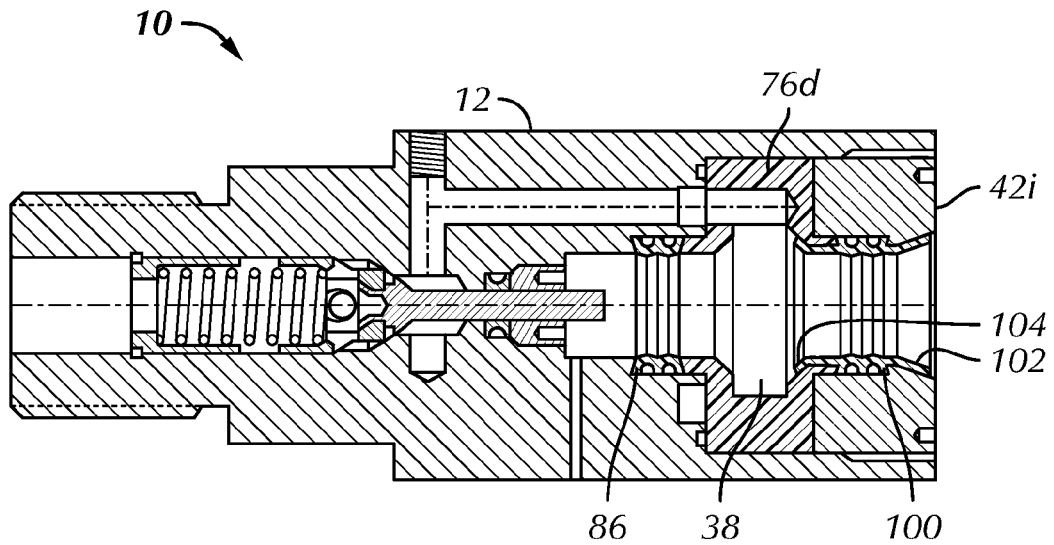
FIG. 19 is a cross-sectional view of a female coupling member according to an embodiment of the invention which has a seal retainer with an annular flow passage and retained seals with double sealing elements one of which has an integral, partial bore liner.

FIG. 19 illustrates a female coupling member according to an embodiment of the invention which comprises a seal retainer 76d with an annular flow passage 38 and retained seals 86 and 100 with double sealing elements. Outer double crown probe seal 100 has an integral, partial bore liner comprised of outer segment 102 and inner segment 104. Seal retainer 76d is similar to that described in connection with the embodiment of FIG. 13 and is retained in female body 12 by retainer nut 42i which is adapted to accommodate outer probe seal 100. Inner probe seal 86 is a double crown seal as described above in connection with the embodiment of FIG. 17.

Figure 19A:
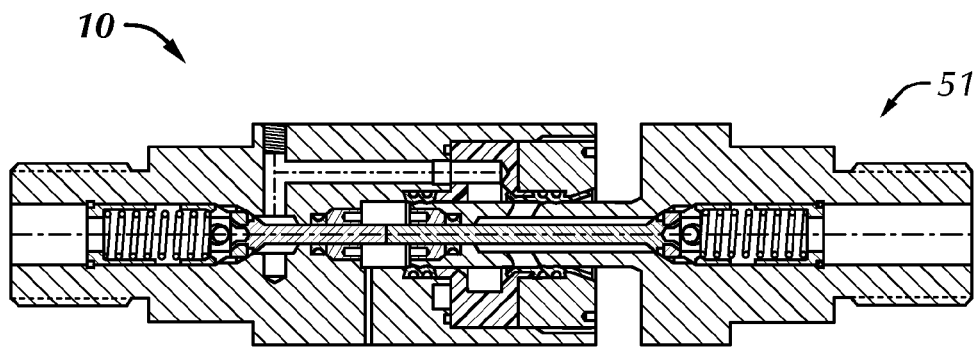
FIG. 19A is a cross-sectional view of the female coupling depicted in FIG. 19 in partial engagement with a male coupling member of the type shown in FIG. 3.
Figure 19B:
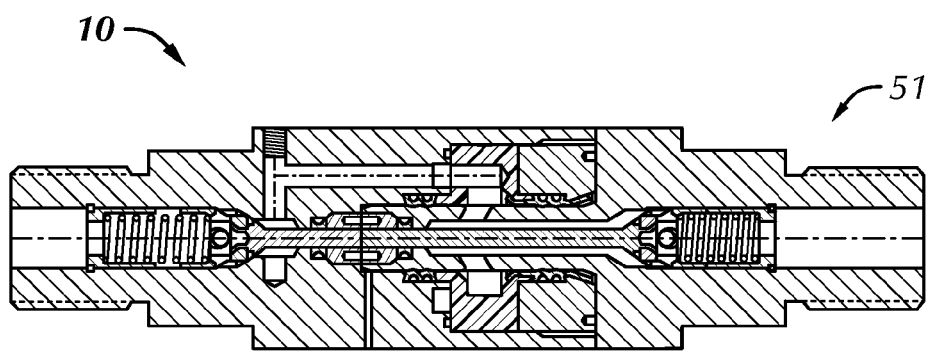
FIG. 19B is a cross-sectional view of the female coupling depicted in FIG. 19 fully engaged with a male coupling member of the type shown in FIG. 3.

The female coupling of FIG. 19 is shown in FIG. 19A in partial engagement with a male coupling member of the type shown in FIG. 3 and in full engagement with the male member in FIG. 19B. A male member of the type shown in FIG. 2 may also be used with this coupling.

Figure 20:
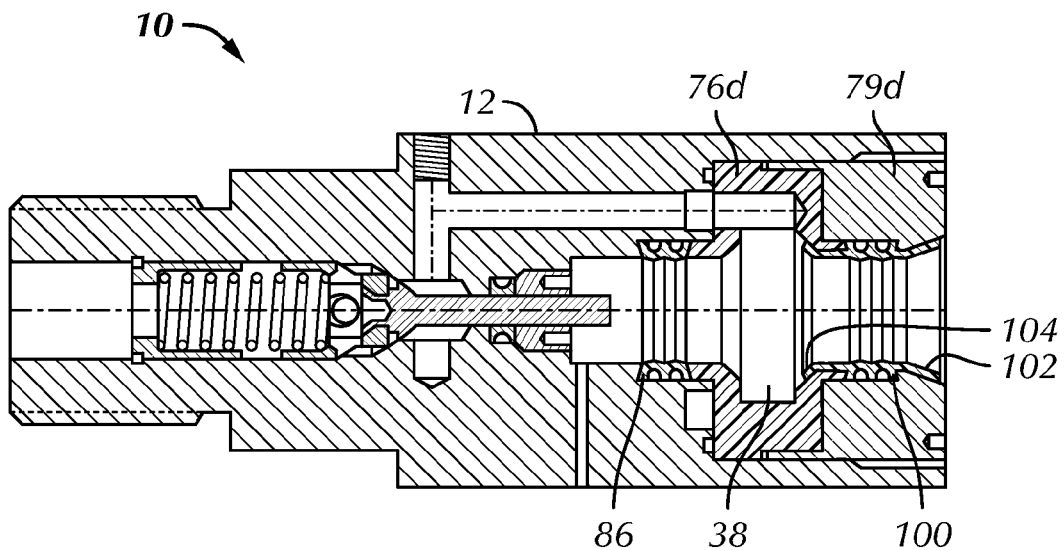
FIG. 20 is a cross-sectional view of a female coupling member according to an embodiment of the invention which has a seal cartridge with an annular flow passage and retained seals with double sealing elements one of which has an integral, partial bore liner.

FIG. 20 shows a female coupling member according to an embodiment of the invention which has a seal cartridge comprised of inner member 78 with an annular flow passage 38 and threaded outer member 79d. Seal cartridge 78d/79d retains probe seals 86 and 100 with double sealing elements in the manner described above in connection with the embodiment of FIG. 14. Outer probe seal 100 has an integral, partial bore liner comprised of outer segment 102 and inner segment 104 as described above in connection with the embodiment of FIG. 19. Inner probe seal 86 may be of the type described above in connection with the embodiment of FIG. 17.

Figure 20A:
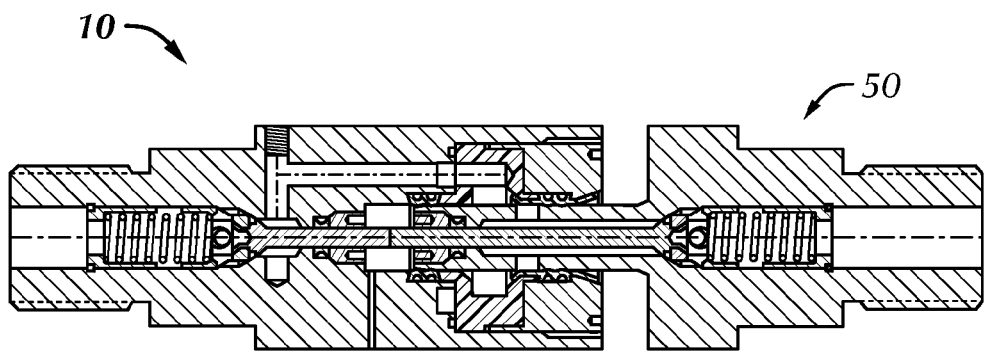
FIG. 20A is a cross-sectional view of the female coupling depicted in FIG. 20 in partial engagement with a male coupling member of the type shown in FIG. 2.
Figure 20B:
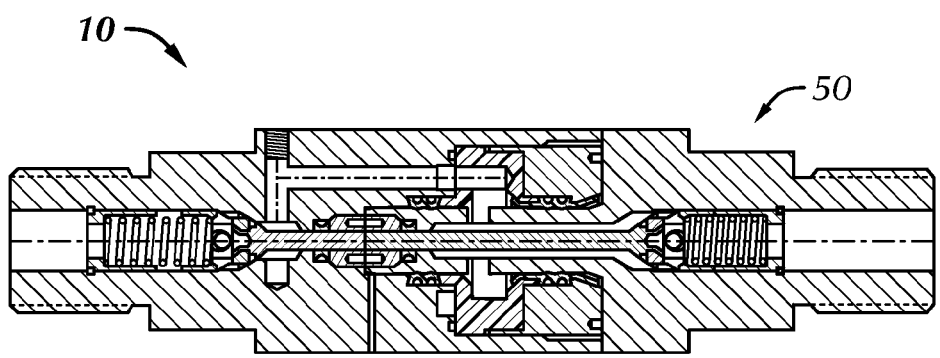
FIG. 20B is a cross-sectional view of the female coupling depicted in FIG. 20 fully engaged with a male coupling member of the type shown in FIG. 2.

The female coupling of FIG. 20 is depicted in FIG. 20A in partial engagement with a male coupling member of the type shown in FIG. 2 and in full engagement with the male member in FIG. 20B. A male coupling having anti-fouling flow ports of the type illustrated in FIG. 3 may also be used.

Figure 21:
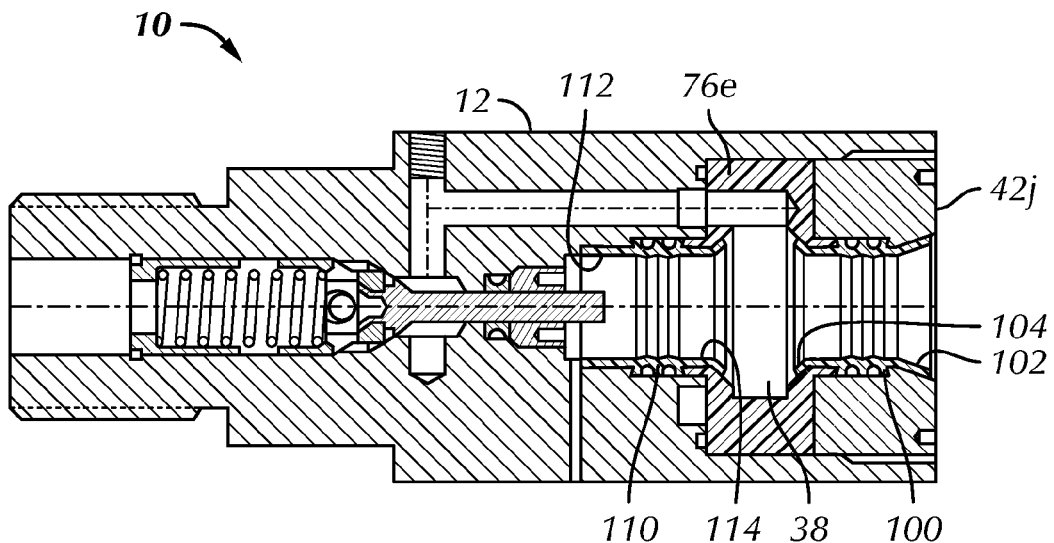
FIG. 21 is a cross-sectional view of a female coupling member according to an embodiment of the invention which has a seal retainer with an annular flow passage and two retained seals with double sealing elements, each of which has an integral bore liner.

FIG. 21 is a cross-sectional view of a female coupling member according to an embodiment of the invention which has a seal retainer 76e with an annular flow passage 38 and two retained seals with double sealing elements, each of which has an integral bore liner. Seal retainer 76e is similar to that described above in connection with the embodiment illustrated in FIG. 15 and may be held within female body 12 by retainer nut 42j. Outer probe seal 100 comprises outer bore liner segment 102 and inner bore liner 104 as described above in connection with the embodiment of FIG. 19. Inner probe seal 110 comprises inner bore liner segment 112 and outer bore liner segment 114.

Together, seals 100 and 110 effectively provide a full bore liner, the unlined segments (e.g., of annular flow path 38) are "out of reach" of the male probe and hence do not benefit from a bore liner.

Figure 21A:
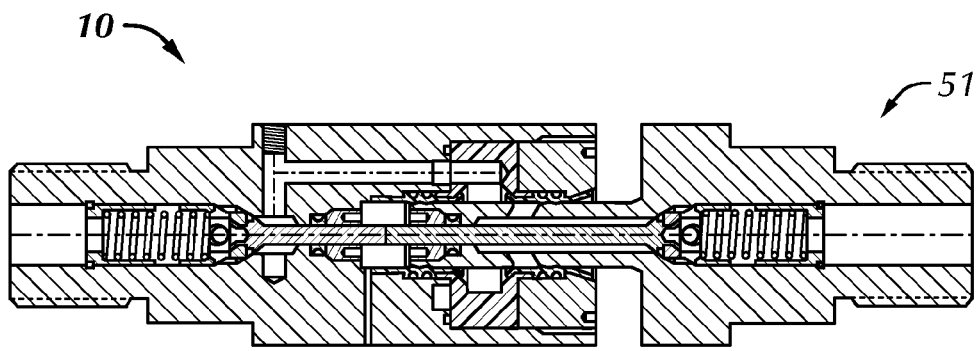
FIG. 21A is a cross-sectional view of the female coupling depicted in FIG. 21 in partial engagement with a male coupling member of the type shown in FIG. 3.
Figure 21B:
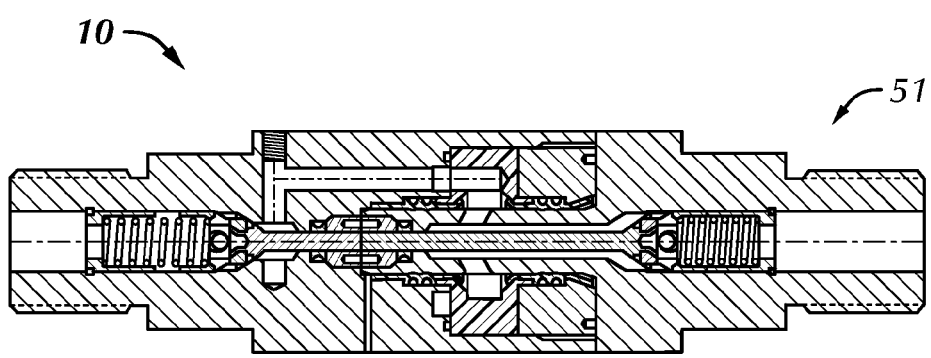
FIG. 21B is a cross-sectional view of the female coupling depicted in FIG. 21 fully engaged with a male coupling member of the type shown in FIG. 3.

The female coupling of FIG. 21 is shown in FIG. 21A in partial engagement with a male coupling member of the type shown in FIG. 3 and in full engagement with the male member in FIG. 21B. A male member of the type shown in FIG. 2 may also be used with this coupling.

Figure 22:
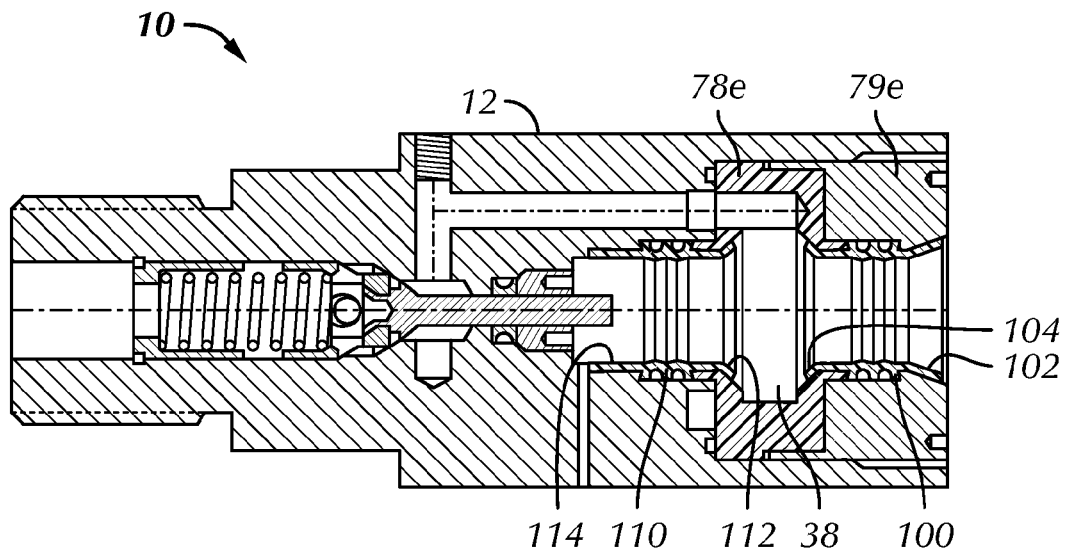
FIG. 22 is a cross-sectional view of a female coupling member according to an embodiment of the invention which has a seal cartridge with an annular flow passage and two retained seals with double sealing elements, each of which has an integral bore liner.

FIG. 22 is a cross-sectional view of a female coupling member according to an embodiment of the invention which has a seal cartridge comprised of inner member 78e and outer member 79e. Inner member 78e has an annular flow passage 38 and seal cartridge 78e/79e is generally similar to that described above in connection with the embodiment of FIG. 16. The embodiment shown in FIG. 22 has two retained probe seals 100 and 110 each with double sealing elements and each with an integral bore liner in the fashion described above in connection with the embodiment of FIG. 21. Outer double crown probe seal 100 has outer bore liner segment 102 and inner bore liner segment 104. Inner double crown probe seal 110 comprises integral outer bore liner segment 112 and inner bore liner segment 114.

Figure 22A:
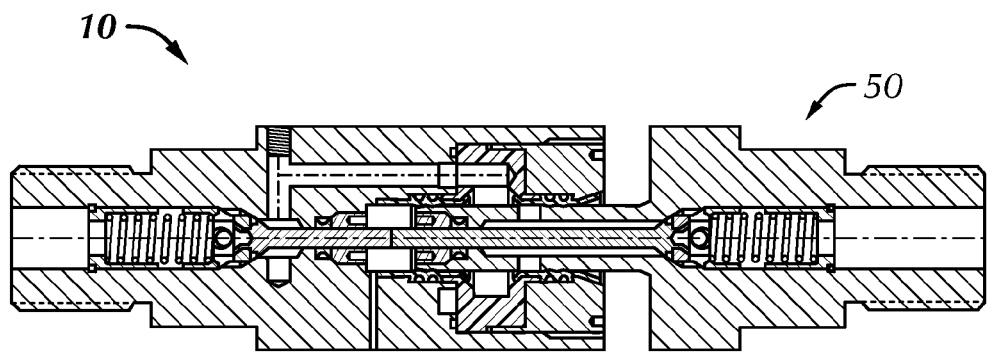
FIG. 22A is a cross-sectional view of the female coupling depicted in FIG. 22 in partial engagement with a male coupling member of the type shown in FIG. 2.
Figure 22B:
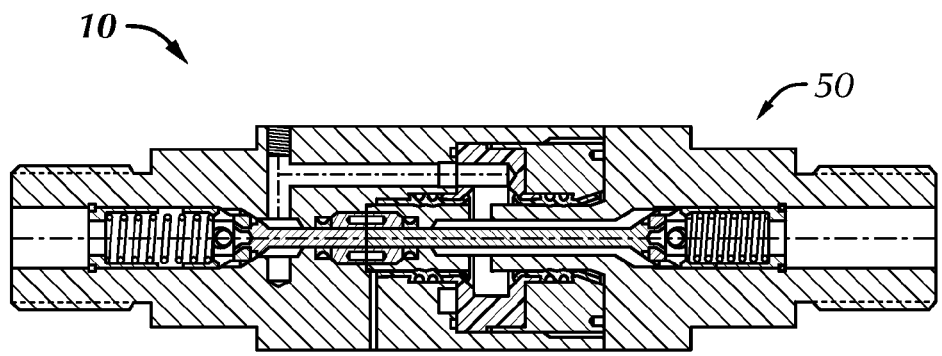
FIG. 22B is a cross-sectional view of the female coupling depicted in FIG. 22 fully engaged with a male coupling member of the type shown in FIG. 2.

The female coupling of FIG. 22 is depicted in FIG. 22A in partial engagement with a male coupling member of the type shown in FIG. 2 and in full engagement with the male member in FIG. 22B. A male coupling having anti-fouling flow ports of the type illustrated in FIG. 3 may also be used.

Figure 23:
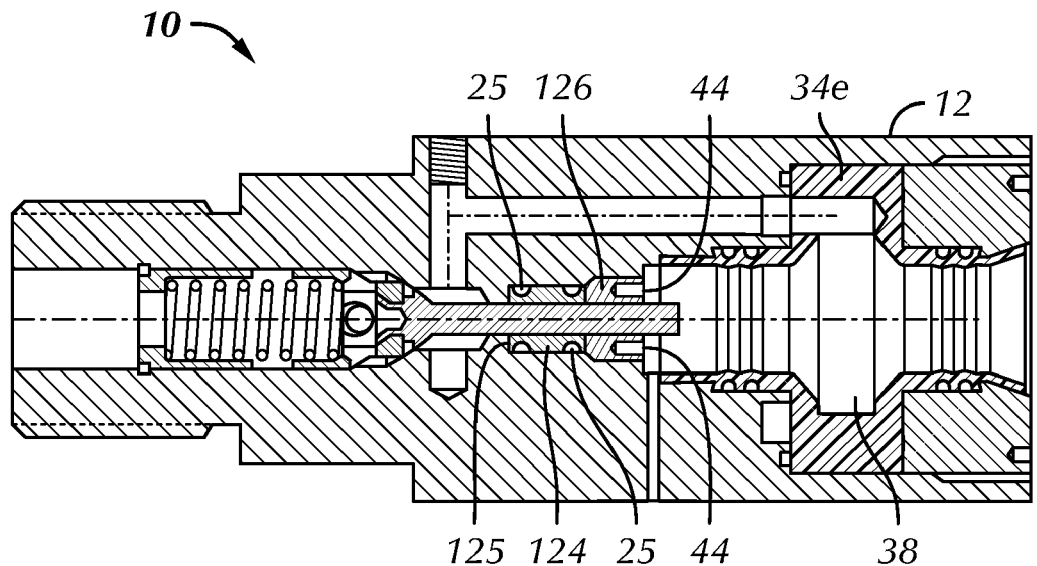
FIG. 23 is a cross-sectional view of a female coupling member according to an embodiment of the invention which has a poppet valve actuator seal with double sealing elements and an integral seal and annular flow passage of the type shown in FIG. 10.

FIG. 23 is a view of a female coupling member according to an embodiment of the invention which has a poppet valve actuator seal 124 with double sealing elements and an integral seal 34e with annular flow passage 38 of the type described above in connection with the embodiment of FIG. 10. Poppet valve actuator seal 124 may have a pair of O-ring seals 25 for sealing engagement with female body 12. Threaded retainer nut 126 holds seal 124 on shoulder 125 of axial bore 18 and may include spanner engagement holes 44 to facilitate installation and removal.

Figure 24:
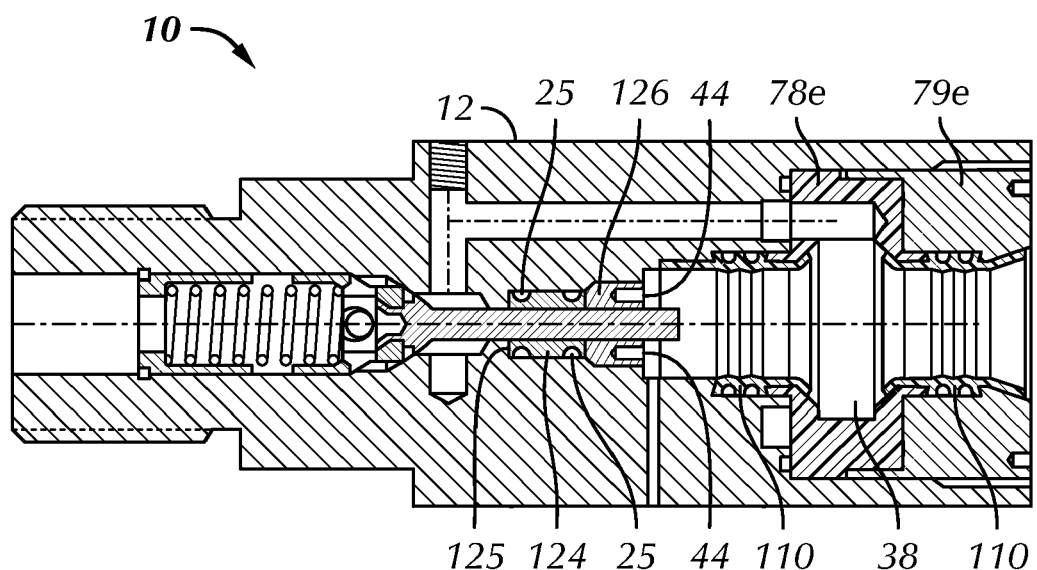
FIG. 24 is a cross-sectional view of a female coupling member according to an embodiment of the invention which has a poppet valve actuator seal with double sealing elements and an a seal cartridge and seals of the type shown in FIG. 22.

FIG. 24 is a cross-sectional view of a female coupling member according to an embodiment of the invention which has a poppet valve actuator seal 124 with double sealing elements as described above in connection with the embodiment of FIG. 23 and an a seal cartridge and double crown probe seals 100 and 110 of the type shown in FIG. 22 and described in connection with that embodiment. Double poppet actuator seal 124 may have enhanced sealing effectiveness as compared to poppet valve actuator seal 24 used in the embodiments shown in FIGS. 1 and, 4 through 22, inclusive.

Although the invention has been described in detail with reference to certain preferred embodiments, variations and modifications exist within the scope of the invention as described and defined in the following claims.

What is claimed is:

1. A female hydraulic coupling member comprising:
   a body having a central axial bore with a stepped internal diameter, a portion of the central axial bore forming a receiving chamber for the probe of a male hydraulic coupling member;
   a first shoulder in the central axial bore at a first step in the internal diameter;
   a first annular groove in the first shoulder;
   a longitudinal passage in the body in fluid communication with the annular groove;
   a substantially radial passage in the body in fluid communication with the central axial bore and the longitudinal passage;
   a substantially cylindrical annular flow piece insertable in the central axial bore having a first end, an opposing second end, a stepped outer diameter forming a first shoulder and a second shoulder, and a central axial bore having a stepped internal diameter with at least two steps forming a first section having a first internal diameter, a second section adjacent the first section having a second internal diameter greater than the first diameter and a third section adjacent the second section having an internal diameter less than the second diameter, a first probe seal integral with the first section, a second probe seal integral with the third section and a passage in fluid communication with the first shoulder and the second section positioned for fluid communication with the annular groove in the first shoulder of the central axial bore of the body when the flow piece is inserted in the bore;
   a retainer nut in threaded engagement with the central axial bore which bears against the second shoulder of the annular flow piece and seats the first shoulder of the annular flow piece against the first shoulder in the central axial bore.

2. A female hydraulic coupling member as recited in claim 1 wherein the annular flow piece is fabricated from an engineering plastic.

3. A female hydraulic coupling member as recited in claim 1 wherein the annular flow piece is fabricated from a material selected from the group consisting of: polyetheretherketone (PEEK), acetal resin, polyoxymethylene (POM), polytrioxane, polyformaldehyde, polytetrafluoroethylene (PTFE), glass-filled PTFE, and PEEK-filled PTFE.

4. A female hydraulic coupling member as recited in claim 1 further comprising a second annular groove in the first shoulder, the second annular groove having a diameter greater than the first annular groove in the first shoulder and a seal in the second annular groove for sealing between the body and the annular flow piece.

5. A female hydraulic coupling member as recited in claim 4 wherein the seal in the second annular groove is an O-ring seal.

6. A female hydraulic coupling member as recited in claim 1 further comprising at least one O-ring seal on the outer circumference of the annular flow piece for sealing between the annular flow piece and the central axial bore of the body.

7. A female hydraulic coupling member as recited in claim 1 wherein the integral probe seals are double crown seals.

8. A female hydraulic coupling member as recited in claim 1 further comprising a second shoulder in the central axial bore at a second step in the internal diameter which abuts the first end of the annular flow piece when it is inserted in the central axial bore.

9. A female hydraulic coupling member as recited in claim 8 wherein the second shoulder is at an acute angle to the axis of the body and the first end of the annular flow piece has a complementary angle to engage the angled shoulder.

10. A female hydraulic coupling member as recited in claim 8 wherein the second end of the annular flow piece is at an acute angle to the axis of the flow piece and the retainer nut has an angled step in a central bore which engages the angled second end of the annular flow piece.

11. A female hydraulic coupling member as recited in claim 1 further comprising a bore liner integral with the annular flow piece that substantially completely lines the bore of the retainer nut.

12. A female hydraulic coupling member as recited in claim 11 wherein the integral probe seals are double crown seals.

13. A female hydraulic coupling member as recited in claim 12 further comprising a bore liner integral with the annular flow piece that substantially completely lines the side wall of the receiving chamber.

14. A female hydraulic coupling member as recited in claim 13 wherein the integral probe seals are double crown seals.

15. A female hydraulic coupling member as recited in claim 13 further comprising a poppet valve in the central axial bore, the poppet valve having a valve actuator which extends into the receiving chamber and a seal having a plurality of sealing surfaces for sealing between the poppet valve actuator and the body of the female member.

16. A female hydraulic coupling member as recited in claim 15 further comprising a plurality of O-ring seals on the outer circumference of the poppet actuator seal for sealing between the actuator seal and the body of the female member.

17. A female hydraulic coupling member comprising:
a body having a central axial bore with a stepped internal diameter, a portion of the central axial bore forming a receiving chamber for the probe of a male hydraulic coupling member;
a first shoulder in the central axial bore at a first step in the internal diameter;
a first annular groove in the first shoulder;
a longitudinal passage in the body in fluid communication with the annular groove;
a substantially radial passage in the body in fluid communication with the central axial bore and the longitudinal passage;
a substantially cylindrical seal retainer with annular flow passage insertable in the central axial bore having a first end, an opposing second end, a stepped outer diameter forming a first shoulder and a second shoulder, and a central axial bore having a stepped internal diameter with at least two steps forming a first section having a first internal diameter, a second section adjacent the first section having a second internal diameter greater than the first diameter thereby forming an annular flow passage and a third section adjacent the second section having an internal diameter less than the second diameter and a longitudinal bore offset from the central axis between the first shoulder and the second section and positioned for fluid communication with the annular groove in the first shoulder of the central axial bore of the body when the seal retainer with annular flow passage is inserted in the bore;
a first probe seal retained between the first end of the seal retainer and a shoulder in the central bore;
a retainer nut in threaded engagement with the central axial bore which bears against the second shoulder of the seal retainer and seats the first shoulder of the seal retainer with annular flow passage against the first shoulder in the central axial bore;
a second probe seal retained between the second end of the seal retainer and a shoulder in the bore of the retainer nut.

18. A female hydraulic coupling member as recited in claim 17 further comprising a single seal for sealing between the body and the seal retainer consisting of a sealing element in a second annular groove in the first shoulder, the second annular groove having a diameter greater than the first annular groove in the first shoulder.

19. A female hydraulic coupling member as recited in claim 18 wherein the sealing element in the second annular groove is an O-ring seal.

20. A female hydraulic coupling member as recited in claim 17 further comprising a single seal for sealing between the body and the seal retainer consisting of a sealing element in an annular groove in the first shoulder of the seal retainer, said annular groove having a diameter greater than the first annular groove in the first shoulder of the axial bore.

21. A female hydraulic coupling member as recited in claim 17 further comprising at least one O-ring seal on the outer circumference of each probe seal for sealing between the probe seal and the central axial bore of the body.

22. A female hydraulic coupling member as recited in claim 17 wherein the probe seals are double crown seals.

23. A female hydraulic coupling member as recited in claim 17 further comprising a second shoulder in the central axial bore at a second step in the internal diameter which retains the first probe seal in the central axial bore.

24. A female hydraulic coupling member as recited in claim 23 wherein the second shoulder is at an acute angle to the axis of the body and the first probe seal has a complementary angle to engage the angled shoulder.

25. A female hydraulic coupling member as recited in claim 17 wherein the second end of the seal retainer is at an acute angle to the axis of the seal retainer, the second probe seal has a first end with a complementary angle to engage the angled second end of the seal retainer, the retainer nut has an angled step in a central bore, and the second probe seal has a second end with a complementary angle which engages the angled step of the retainer nut.

26. A female hydraulic coupling member as recited in claim 17 further comprising a bore liner integral with the second probe seal that substantially completely lines the bore of the retainer nut and at least a portion of the bore of the seal retainer.

27. A female hydraulic coupling member as recited in claim 26 wherein the probe seals comprise double crown seals.

28. A female hydraulic coupling member as recited in claim 27 further comprising a bore liner integral with the first probe seal that substantially completely lines the side wall of the receiving chamber and at least a portion of the bore of the seal retainer.

29. A female hydraulic coupling member as recited in claim 28 wherein the probe seals comprise double crown seals.

30. A female hydraulic coupling member comprising:
a body having a central axial bore with a stepped internal diameter, a portion of the central axial bore forming a receiving chamber for the probe of a male hydraulic coupling member;
a first shoulder in the central axial bore at a first step in the internal diameter;
a first annular groove in the first shoulder;

a longitudinal passage in the body in fluid communication with the annular groove;

a substantially radial passage in the body in fluid communication with the central axial bore and the longitudinal passage;

a substantially cylindrical seal cartridge with annular flow passage insertable in the central axial bore having a first end, an opposing second end, a stepped outer diameter forming a first shoulder, the seal cartridge comprising an inner piece having a central axial bore with a stepped internal diameter with at least two steps forming a first section having a first internal diameter, a second section adjacent the first section having a second internal diameter greater than the first diameter thereby forming an annular flow passage and a third section adjacent the second section having an internal diameter less than the second diameter and a longitudinal bore offset from the central axis between the first shoulder and the second section and positioned for fluid communication with the annular groove in the first shoulder of the central axial bore of the body when the seal cartridge with annular flow passage is inserted in the bore and an outer shell with a central axial bore and an externally threaded surface for engaging the bore of the female body, the outer shell having a circumferential interference fit with the inner piece of the seal cartridge;

a first probe seal retained between the first end of the seal retainer and a shoulder in the central bore;

a second probe seal retained between the inner piece and the outer shell of the seal cartridge.

31. A female hydraulic coupling member as recited in claim 30 further comprising a single seal for sealing between the body and the seal cartridge consisting of a sealing element in a second annular groove in the first shoulder, the second annular groove having a diameter greater than the first annular groove in the first shoulder.

32. A female hydraulic coupling member as recited in claim 31 wherein the sealing element in the second annular groove is an O-ring seal.

33. A female hydraulic coupling member as recited in claim 30 further comprising at least one O-ring seal on the outer circumference of each probe seal for sealing between the probe seal and the central axial bore of the body.

34. A female hydraulic coupling member as recited in claim 30 wherein the probe seals are double crown seals.

35. A female hydraulic coupling member as recited in claim 30 further comprising a second shoulder in the central axial bore at a second step in the internal diameter which retains the first probe seal in the central axial bore.

36. A female hydraulic coupling member as recited in claim 35 wherein the second shoulder is at an acute angle to the axis of the body and the first probe seal has a complementary angle to engage the angled shoulder.

37. A female hydraulic coupling member as recited in claim 34 wherein the second end of the seal cartridge is at an acute angle to the axis of the seal retainer, the second probe seal has a first end with a complementary angle to engage the angled second end of the seal cartridge, the outer shell has an angled step in a central bore, and the second probe seal has a second end with a complementary angle which engages the angled step of the outer shell.

38. A female hydraulic coupling member as recited in claim 30 further comprising a bore liner integral with the second probe seal that substantially completely lines the bore of the outer shell of the seal cartridge and at least a portion of the bore of the inner member of the seal cartridge.

39. A female hydraulic coupling member as recited in claim 38 wherein the probe seals comprise double crown seals.

40. A female hydraulic coupling member as recited in claim 38 further comprising a bore liner integral with the first probe seal that substantially completely lines the side wall of the receiving chamber and at least a portion of the bore of the seal cartridge.

41. A female hydraulic coupling member as recited in claim 40 wherein the probe seals comprise double crown seals.

42. A female hydraulic coupling member as recited in claim 40 further comprising a poppet valve in the central axial bore, the poppet valve having a valve actuator which extends into the receiving chamber and a seal having a plurality of sealing surfaces for sealing between the poppet valve actuator and the body of the female member.

43. A female hydraulic coupling member as recited in claim 42 further comprising a plurality of O-ring seals on the outer circumference of the poppet actuator seal for sealing between the actuator seal and the body of the female member.

* * * * *